United States Patent
Kitazoe

(10) Patent No.: US 8,804,656 B2
(45) Date of Patent: Aug. 12, 2014

(54) INTER-ENODE B HANDOVER PROCEDURE

(75) Inventor: Masato Kitazoe, Hachiouji (JP)

(73) Assignee: Qualcomm Incorporated, San Diego, CA (US)

( * ) Notice: Subject to any disclaimer, the term of this patent is extended or adjusted under 35 U.S.C. 154(b) by 420 days.

(21) Appl. No.: 12/438,124

(22) PCT Filed: Oct. 30, 2007

(86) PCT No.: PCT/US2007/083033
§ 371 (c)(1),
(2), (4) Date: Mar. 11, 2009

(87) PCT Pub. No.: WO2008/055169
PCT Pub. Date: May 8, 2008

(65) Prior Publication Data
US 2010/0238903 A1 Sep. 23, 2010

Related U.S. Application Data

(60) Provisional application No. 60/863,791, filed on Oct. 31, 2006.

(51) Int. Cl.
*H04W 4/00* (2009.01)
(52) U.S. Cl.
USPC ............................ 370/331; 455/436; 455/438
(58) Field of Classification Search
USPC ............... 370/329, 330, 331, 332, 333, 334; 455/436, 437, 438, 439, 442, 443, 444
See application file for complete search history.

(56) References Cited

U.S. PATENT DOCUMENTS

| | | | |
|---|---|---|---|
| 6,983,148 B1 | 1/2006 | Kirla | |
| 7,031,391 B1 | 4/2006 | Riffee | |
| 7,596,378 B1 | 9/2009 | Nizri et al. | |
| 2002/0032032 A1 | 3/2002 | Haumont et al. | |
| 2002/0066011 A1 | 5/2002 | Vialen et al. | |
| 2002/0160785 A1 | 10/2002 | Ovesjo et al. | |
| 2002/0191556 A1 | 12/2002 | Krishnarajah et al. | |
| 2004/0002337 A1* | 1/2004 | Wheeler et al. | ............... 455/445 |
| 2005/0272426 A1 | 12/2005 | Yang et al. | |
| 2006/0003767 A1 | 1/2006 | Kim et al. | |
| 2006/0056448 A1* | 3/2006 | Zaki et al. | ..................... 370/466 |

(Continued)

FOREIGN PATENT DOCUMENTS

| | | |
|---|---|---|
| EP | 1107633 | 6/2001 |
| EP | 1232667 | 8/2002 |

(Continued)

OTHER PUBLICATIONS

Co-pending U.S. Appl. No. 60/895,128, filed on Mar. 15, 2007.

(Continued)

*Primary Examiner* — Dady Chery
(74) *Attorney, Agent, or Firm* — Florin Corie

(57) ABSTRACT

Methodologies are described that facilitate inter-eNode B handover. In various embodiments, logical protocol termination can be implemented between the user equipment and the target eNode B for inter-eNode B handover signaling. The provided handover forwarding and encapsulation mechanisms enable improved inter-operability between eNode Bs implementing different protocol versions or from different vendors, which in turn enables frequent protocol upgrades. Additionally, the invention enables the target eNode B to implement new radio configurations even if the configuration is unsupported by the source eNode B.

45 Claims, 18 Drawing Sheets

(56) References Cited

U.S. PATENT DOCUMENTS

| | | | |
|---|---|---|---|
| 2007/0047493 A1 | 3/2007 | Park et al. | |
| 2007/0224993 A1 | 9/2007 | Forsberg | |
| 2007/0293224 A1* | 12/2007 | Wang et al. | 455/436 |
| 2008/0240439 A1 | 10/2008 | Mukherjee et al. | |
| 2009/0046656 A1 | 2/2009 | Kitazoe et al. | |

FOREIGN PATENT DOCUMENTS

| | | |
|---|---|---|
| EP | 1583292 A1 | 10/2005 |
| EP | 1713207 A1 | 10/2006 |
| GB | 2414898 A | 12/2005 |
| JP | 2004343559 A | 12/2004 |
| JP | 2006245913 A | 9/2006 |
| WO | WO-0027158 | 5/2000 |
| WO | WO0124557 | 4/2001 |
| WO | 0189157 | 11/2001 |
| WO | WO02089502 | 11/2002 |
| WO | WO03043355 | 5/2003 |
| WO | WO2007007990 A1 | 1/2007 |
| WO | WO2007066882 A1 | 6/2007 |
| WO | WO2007149509 A2 | 12/2007 |

OTHER PUBLICATIONS

Taiwan Search Report—TW096141081—TIPO—Feb. 9, 2011.
3GPP TR 25.912 v0.2.0 Technical Report : "Technical Specification Group Radio Access Network; Feasibility Study for Evolved UTRA and UTRAN (Release 7)" 3RD Generation Partnership Project (3GPP); (Jun. 6, 2006), pp. 1-57, XP002455821.
Ericsson: "S1 Procedure Descriptions: S1 Handover Procedures" 3GPP TSG-RAN WG3 #56, R3-070917, [Online] (May 7-11, 2007), pp. 1-9, XP002501849.
Ericsson: "Some Aspects of the Handover Signaling in LTE" 3GPP TSG-RAN WG2 #57, R2-070567, [Online] (Feb. 12-16, 2007), pp. 1-4, XP002501848.
QUALCOMM Europe: "Delivery of HO Command" 3GPP TSG-RAN WG2 Meeting #58-BIS, R2-072786, [Online] (Jun. 25-29, 2007), pp. 1-3, XP002501847.
Barth U., "3GPP Long-Term Evolution/System Architecture Evolution—Overview", Alcatel, Sep. 2006, http://cc.ee.ntu.edu.tw/farn/courses/FMV/01-3GPP_LTE-SAE_Overview_Sep06.pdf.
"3rd Generation Partnership Project; Technical Specification Group Radio Access Network; Evolved Universal Terrestrial Radio Access (E-UTRA) and Evolved Universal Terrestrial Radio Access Network (E-UTRAN); radio interface protocol aspects (release 7)," 3GPP TR 25.813 V7.1.0, Sep. 1, 2006, pp. 1-41.
Samsung, "Future Converged radio access system," (3GPP Perspective), Jun. 27, 2006, pp. 1-30.
The International Search Report and the Written Opinion of the International Searching Authority mailed on Nov. 10, 2008 for PCT/US2007/083033.
Ericsson, "Integrity protection and ciphering at GSM to UMTS handover", ETSI STC SMG2 handover ad-Hoc, Mar. 6-8, 2000.

\* cited by examiner

INTER-ENODE B HANDOVER PROCEDURE

CROSS-REFERENCE TO RELATED APPLICATIONS

This application claims the benefit of priority under 35 U.S.C Section 119 from U.S. Provisional Patent Application Ser. No. 60/863,791 entitled "INTER-ENB HANDOVER PROCEDURE", filed on Oct. 31, 2006, the entirety of which is incorporated herein by reference.

BACKGROUND

I. Field

The following description relates generally to wireless communications, and more particularly to mechanisms for inter-eNode B (eNB) handover.

II. Background

Wireless communication systems are widely deployed to provide various types of communication; for instance, voice and/or data may be provided via such wireless communication systems. A typical wireless communication system, or network, can provide multiple users access to one or more shared resources. For instance, these systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can support simultaneous communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. Such communication links can be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system can support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In cellular wireless systems, a service area is divided into a number of coverage zones generally referred to as cells. Each cell may be further subdivided into a number of sectors served by a number of base stations. While each sector is typically depicted as a distinct geographical area, sectors typically provide overlapping signal coverage to provide seamless communication as wireless terminals or user equipment (UE) transit from a cell to an adjacent cell. For example, when a mobile user passes between cells, there must be efficient communications handover or handoff between base stations to provide a seamless mobile internet experience to the user. Without an efficient mechanism to hand-off mobile users between cells, the user would experience service interruptions and delays, lost transmissions, or dropped calls.

A handoff, or handover (HO), is the process in which a UE (e.g., a wireless phone) is handed from one cell to the next in order to maintain a radio connection with the network. The variables that dictate a handover depend on the type of cellular system. For example, in CDMA systems interference requirements are the limiting factor for handover. In FDMA and TDMA systems such as the Global System for Mobile communications (GSM), the main limiting factor is the signal quality available to the UE.

One form of handover or handoff is when a UE call in progress is redirected from its current cell (e.g., the source cell) and channel to a new cell (e.g., the target cell) and channel. In terrestrial networks, the source and the target cells may be served from two different cell sites or from two different sectors of the same cell site. The former is called an inter-cell handover, where the latter refers to a handover within one sector or between different sectors of the same cell (e.g., an intra-cell handover). Generally, the purpose of inter-cell handover is to maintain the call as the subscriber is moving out of the area covered by the source cell and entering the area of the target cell.

As an example, during a call, one or more parameters of the signal in the channel in the source cell are monitored and assessed in order to decide when a handoff may be necessary (e.g., the DL and/or UL may be monitored). Typically, the handoff may be requested by the UE or by the base station of its source cell and, in some systems, by a base station of a neighboring cell. The phone and the base stations of the neighboring cells monitor each other others' signals and the best target candidates are selected among the neighboring cells.

For example, Universal Mobile Telecommunications System (UMTS) Terrestrial Radio Access Network (UTRAN) contains base stations (e.g., Node Bs), and Radio Network Controllers (RNC). The RNC provides control functionalities for one or more Node Bs and carries out Radio Resource Management (RRM), some of the mobility management functions, and is the point where encryption is done before user data is sent to and from the mobile. A Node B and an RNC can be the same device, although typical implementations have a separate RNC located in a central office serving multiple Node B's. The RNC and its corresponding Node Bs are called the Radio Network Subsystem (RNS). There can be more than one RNS present in an UTRAN. The UE requires a Radio Resource Control (RRC) connection to access the services of the UMTS network, which is a point to point bi directional connection between the RRC entities on the UE and UTRAN (e.g., the RRC is terminated in the UTRAN). Typically the UMTS handover mechanism (e.g., measurement, decision, and execution) is centrally controlled where the RNC is responsible for handover decisions, requiring handover signaling to the UE, and requiring complicated coordination via 3-way handshake (Measurement Report, Handover Command (HO Command), and HO Complete) among the network components.

One problem in connection with such a mechanism is that interoperability issues with deploying UTRAN equipment from different vendor have generally hindered mobile operators' attempts to deploy multi-vendor networks. In addition, interoperability issues with different RRC protocol versions limits opportunities for mobile operators to implement protocol upgrades.

In Evolved Universal Terrestrial Radio Access Network (E-UTRAN), RRM is more distributed than that of UTRAN by implementing RRM functions at the evolved Node B (eNode B) level. As a result, there is increased likelihood that due to protocol mismatches, new radio configurations will not be used in the target eNode B due to lack of support from a source eNode B. The current working assumption for the handover signaling for LTE is to have the same 3-way handshake (e.g., Measurement Report, HO command and HO Complete) as in UMTS, with the above identified difficulties anticipated. In addition to solving these problems, further improvements are desired in connection with inter-eNode B (eNB) handover procedure to allow mobile operators to benefit from frequent protocol upgrades, including physical layer upgrades, allow mobile operators to aggressively employ multi-vendor networks, and enable new radio configurations usage in the target eNode B despite lack of protocol support from the source eNode B.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating inter-eNode B handover. As described above, E-UTRAN implements a number of radio resource management function functions at eNode B level. The current working assumption for handover signaling is to use the same 3-way handshake as in UMTS, with the above identified difficulties, where the UMTS handover mechanism (e.g., measurement, decision, and execution) is centrally controlled. However, significant architectural differences exists, such that protocol optimizations can be implemented to allow mobile operators to benefit from frequent protocol upgrades (including physical layer upgrades), allow mobile operators to aggressively employ multi-vendor networks, and enable new radio configurations usage in the target eNode B despite lack of protocol support from the source eNode B.

In accordance with various non-limiting embodiments, the invention provides architectural and protocol changes for inter-node handover procedure. According to various aspects of the invention, logical protocol termination can be implemented between the UE and the target eNB for inter-eNB HO signaling. Advantageously, protocol termination between UE and the target eNB enables elimination of the UMTS HO Complete message for LTE, which allows for relatively more simple protocol implementations. According to further aspects of the invention, a Measurement Report message and a HO Command message can be forwarded to the target node and the UE respectively by the source node.

According to further non-limiting embodiments, the HO Command message can be encapsulated into an appropriate RRC message (e.g., a RRC direct transfer) by the source eNB. Advantageously, the source eNB does not require the ability to understand all the contents in the HO Command message. Thus, source eNB can minimally require only the ability to identify the HO Command message as a HO Command message, according to various embodiments. In further embodiments, the source eNB can include the ability to discern the HO Command message destination. Advantageously, the forwarding mechanism of the present invention does not require the relatively more complicated coordination mechanism between the source BS and the target BS of UMTS, which may be challenging in the multi-vendor network. As will be appreciated, the provided handover forwarding and encapsulation mechanisms enable improved inter-operability between eNode Bs implementing different protocol versions or from different vendors, which in turn enables frequent protocol upgrades. Additionally, the invention enables the target eNode Bs to implement new radio configurations even if the configuration is unsupported by the source eNode B.

To the foregoing and related ends, various methods that facilitate inter-eNode B handover are described herein. One method can comprise receiving and encapsulating, by a source node, a handover command message created by a target node into a Radio Resource Control message. Further, the method can include enciphering an encapsulated handover command message based on a pre-existing security association between a UE associated with the handover command message and the source node. Advantageously, the method does not require a new security association between the UE and the target node. For example, an existing security association can be provided by any one or more of existing radio interface layers, sublayers, protocols, and/or the like, or any combination thereof (e.g., Radio Link Control (RLC), Packet Data Convergence Protocol (PDCP), etc.). The method can further include transmitting the encapsulated handover command message to the wireless terminal. Additionally, the method can include applying integrity protection on the encapsulated handover command message by a source node (e.g., a Radio Resource Control (RRC) of the source node).

In a related embodiment of the invention, a method can comprise receiving and processing measurement report information by a target base station. Additionally, the method can include determining, by the target base station, a handover decision concerning a mobile device associated with the measurement report information, and transmitting a handover command to the mobile device, wherein the handover command includes supplemental information to facilitate generating the handover complete indicator in the wireless communication system.

In yet another embodiment, a method is provided for inter-node transfer in a wireless communication system that comprises transmitting, by a mobile device, a measurement report message to a source node for source node encapsulation into an inter-node message (e.g., an inter-eNodeB message) and forwarding to a target node, and receiving, by the mobile device, a source node encapsulated handover command message forwarded from the target node.

A further embodiment of the invention relates to a communications apparatus. The communications apparatus can include a memory that retains instructions for receiving and encapsulating HO Commands from target nodes. Additionally, the memory can further retain instructions for enciphering and transmitting a handover command to the UE. Further, the communications apparatus can include a processor, coupled to the memory, configured to execute the instructions retained in the memory.

In a related embodiment, a communications apparatus can include a memory that retains instructions for receiving and processing, by a target node, a measurement report message.

The memory can further retain instructions for determining, by the target node, a handover decision concerning a wireless terminal associated with the measurement report message. Further, the communications apparatus can include a processor, coupled to the memory, configured to execute the instructions retained in the memory.

Still other embodiments relate to a machine-readable media having stored thereon machine-executable instructions for performing various embodiments of the invention described herein. In other embodiments of the invention, an apparatus in a wireless communication system can include a processor, wherein the processor can be configured to perform the various embodiments of the invention described herein.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
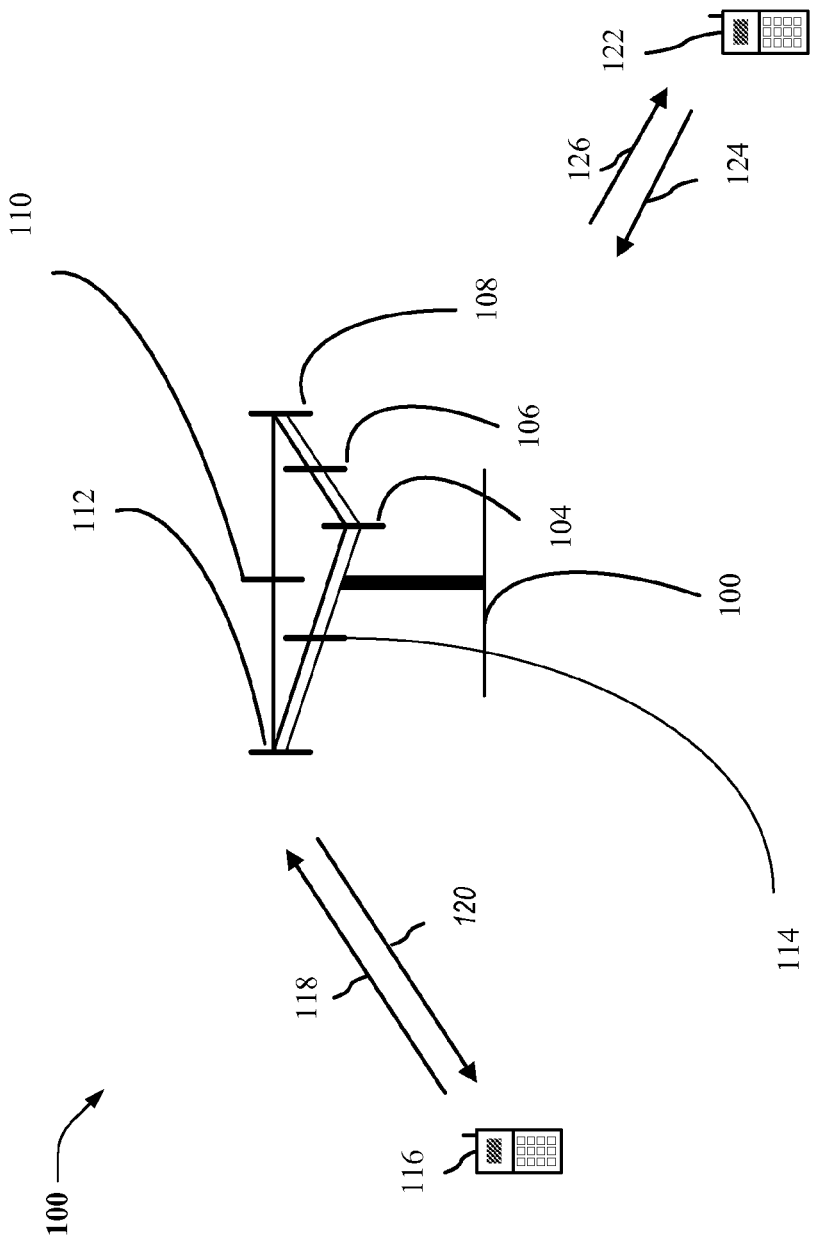
FIG. 1 illustrates a multiple access wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of inter-eNode B handover in E-UTRAN communications systems. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, access terminal, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, e-Node B, source or target nodes, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as UMTS Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of inter-eNode B (eNB) handover procedures as it applies to LTE and E-UTRAN, and as a result, 3GPP terminology may be used be used in much of the description below, where appropriate.

Referring now to FIG. 1, a multiple access wireless communication system according to one embodiment is illustrated. Access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
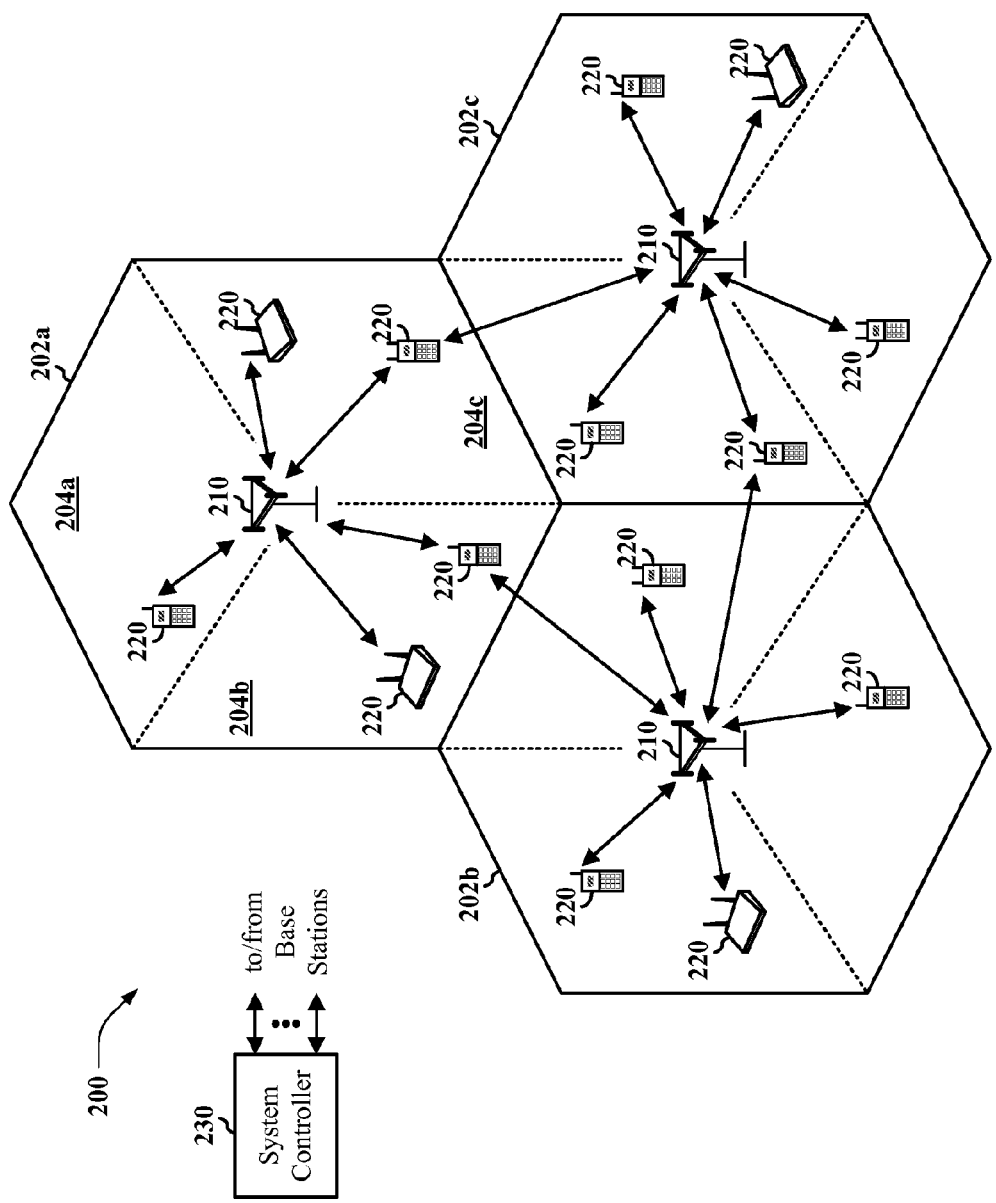
FIG. 2 illustrates a wireless communication system in accordance with further aspects of the present invention.

FIG. 2 illustrates a wireless communication system 200 with multiple base stations 210 and multiple terminals 220 as may be utilized in conjunction with one or more aspects of the present invention. A base station is generally a fixed station that communicates with the terminals and may also be called an access point, a Node B, e-Node B, or some other terminology. Each base station 210 provides communication coverage for a particular geographic area, illustrated as three geographic areas, labeled 202*a*, 202*b*, and 202*c*. The term "cell" can refer to a base station and/or its coverage area depending on the context in which the term is used. To improve system capacity, a base station coverage area may be partitioned into multiple smaller areas (e.g., three smaller areas, according to cell 202*a* in FIG. 2), 204*a*, 204*b*, and 204*c*. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 220 are typically dispersed throughout the system, and each terminal may be fixed or mobile. A terminal may also be called an access terminal, user equipment (UE), a wireless communication device, a mobile station, a user device, or some other terminology. A terminal may be a wireless device, a cellular phone, a personal digital assistant (PDA), a wireless modem card, and so on. Each terminal 220 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 230 couples to base stations 210 and provides coordination and control for base stations 210. For a distributed architecture, base stations 210 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points via one or more antennas at the terminals 220 and or at the base stations 210, as described above with respect to FIG. 1.

As described above, E-UTRAN implements a number of radio resource management function functions at eNode B level. The current working assumption for handover signaling is to use the same 3-way handshake as in UMTS, with the above identified difficulties, where the UMTS handover mechanism (e.g., measurement, decision, and execution) is centrally controlled. However, significant architectural differences exists, such that protocol optimizations can be implemented to allow mobile operators to benefit from frequent protocol upgrades (including physical layer upgrades), allow mobile operators to aggressively employ multi-vendor networks, and enable new radio configurations usage in the target eNode B despite lack of protocol support from the source eNode B.

Figure 3A:
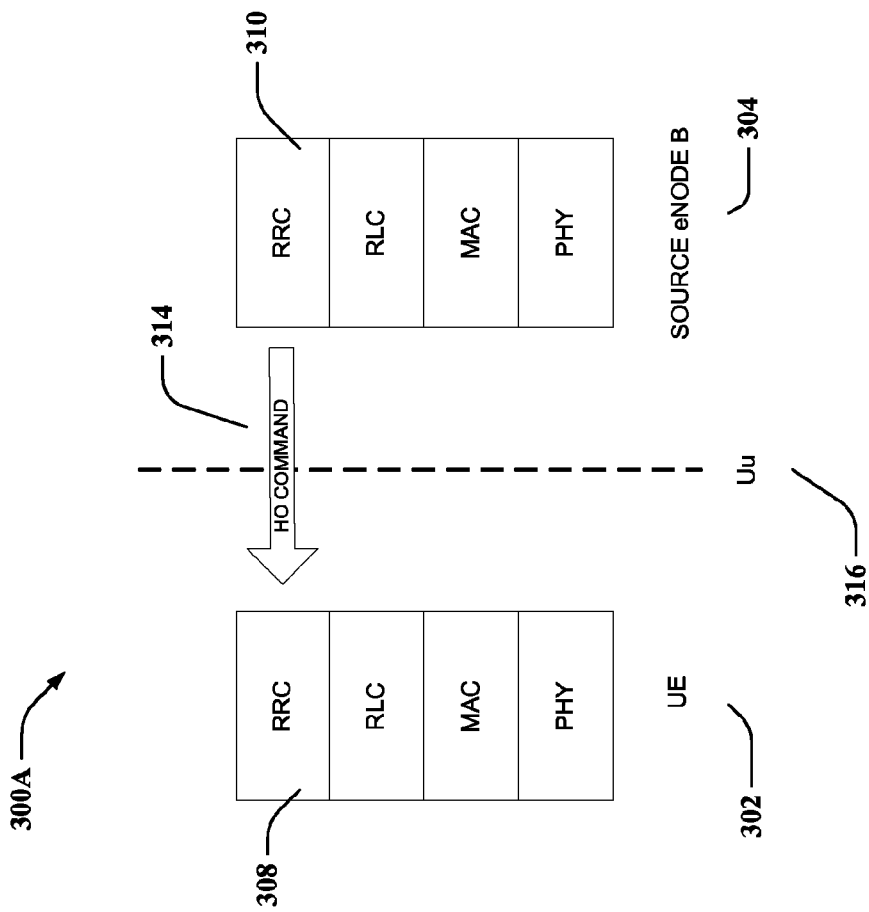
FIG. 3A illustrates a non-limiting high-level block diagram of a system that facilitates intra-eNode B handover in which a HO Command message transfer is depicted.

FIG. 3A illustrates a non-limiting high-level block diagram of a system that facilitates intra-eNode B handover, in which a HO Command message transfer is depicted. The system 300A includes user equipment 302 that is communicatively coupled to a base station 304 (referred to as source eNode B) in a wireless manner. With reference to FIGS. 3 and 4, Uu (316 416) is an external interface, connecting the eNode B with the UE, and X2 (318 418) is an interface between eNode Bs including both a control and a user plane. User equipment 302 can be mobile in nature, such that quality associated with signals received from base station 304 can vary as UE 302 translates within a sector or to a different sector within the same cell requiring an intra-eNode B handover. The common understanding is that an HO Command 314 is a RRC signaling message, where the message is physically transmitted by the source cell or eNode B 304 in a regular handover. In addition, HO Command protocol termination for particular physical network entities can be described as being created by the RRC 310 in the source eNB 304, in case of intra-eNB handover.

Figure 3B:
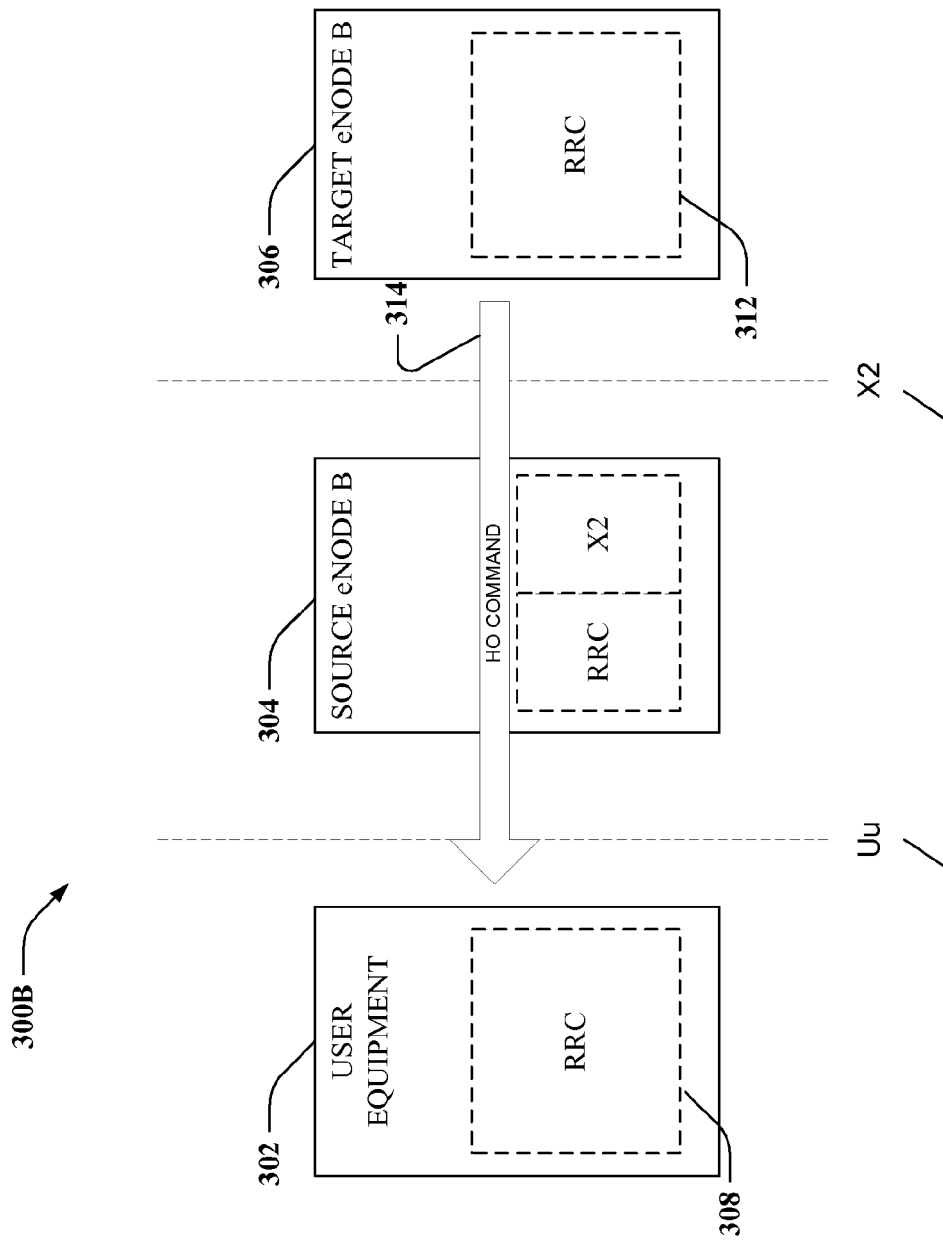
FIG. 3B illustrates an exemplary non-limiting high-level block diagram of a system that facilitates inter-eNode B handover in which a HO Command message transfer is depicted, and to which various aspects of the present invention are applicable.

FIG. 3B illustrates an exemplary non-limiting high-level block diagram of a system that facilitates inter-eNode B handover, to which various aspects of the present invention are applicable. The system 300B includes user equipment 302 that is communicatively coupled to a base station 304 (referred to as source eNode B) in a wireless manner. User equipment 302 can be mobile in nature, such that quality associated with signals received from base station 304 can vary as UE 302 translates within a geographic region requiring inter-eNode B handover to a target eNode B 306. As described above, for the case of inter-eNB handover, RRC is terminated in the eNB (304 306) as opposed to the RNC in UMTS. Thus, it is possible that the target eNB 306 supports a newer RRC protocol version with respect to the one that the source eNB 304 implements. As a result, without modifications to the UMTS inter-Node B handover procedure, target eNB 306 can be prevented from configuring radio parameters that are only realized by the target eNB RRC protocol 312, because such a configuration may not be understood by the source eNB 304.

The following discussion provides additional background information regarding signaling between the network (e.g., base station 304 and or system controller 230) and the wireless terminal (e.g., UE 302 or access terminal 220) in the context of UMTS. In an aspect, logical channels are classified into Control Channels and Traffic Channels. Logical Control Channels comprise Broadcast Control Channel (BCCH), which is a DL channel for broadcasting system control information, Paging Control Channel (PCCH), which is a DL channel that transfers paging information, and Multicast Control Channel (MCCH), which is point-to-multipoint DL channel used for transmitting Multimedia Broadcast and Multicast Service (MBMS) scheduling and control information for one or several Multicast Traffic Channels (MTCHs). Generally, after establishing Radio Resource Control (RRC) connection, this channel is only used by UEs 302 that receive MBMS. Dedicated Control Channel (DCCH) is a point-to-point bi-directional channel that transmits dedicated control information and used by UEs 302 having an RRC connection. In a further aspect, logical traffic channels comprise a Dedicated Traffic Channel (DTCH), which is point-to-point bi-directional channel, dedicated to one UE for the transfer of user information, and also a MTCH for Point-to-multipoint DL channel for transmitting traffic data.

In a further aspect, transport channels are classified into DL and UL. DL transport channels comprise a Broadcast Channel (BCH), Downlink Shared Data Channel (DL-SDCH), and a Paging Channel (PCH), wherein the PCH for support of UE power saving (Discontinuous Reception (DRX) cycle is indicated by the network to the UE), broadcasted over an entire cell and mapped to PHY resources, which can be used for other control/traffic channels. The UL transport channels comprise a Random Access Channel (RACH), a Request Channel (REQCH), a Uplink Shared Data Channel (UL- SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In accordance with various non-limiting embodiments, the invention provides architectural and protocol changes for inter-node handover procedure. According to various aspects of the invention, logical protocol termination can be implemented between the UE 302 and the target eNB 306 for inter-eNB HO signaling. Advantageously, protocol termination between UE and the target eNB enables elimination of the UMTS HO Complete message for LTE, which allows for relatively more simple protocol implementations. According to further aspects of the invention, a Measurement Report message and a HO Command 314 message can be forwarded to the target BS 306 and the UE 302 respectively by the source BS 304.

In further non-limiting embodiments, the HO Command message 314 can be encapsulated into an appropriate RRC message (e.g., a RRC direct transfer) by the source eNB 304. Advantageously, the source eNB 304 does not require the ability to understand all the contents in the HO Command message 314. Thus, source eNB 304 can minimally require only the ability to identify the HO Command message 314 as a HO Command message, according to various embodiments. In further embodiments, the source eNB 404 can include the ability to discern the HO Command message destination. Advantageously, the forwarding mechanism of the present invention does not require the relatively more complicated coordination mechanism between the source BS and the target BS of UMTS, which may be challenging in the multi-vendor network. As will be appreciated, the disclosed changes enable improved interoperability between eNBs implementing different protocol version or between eNBs from different vendors, which in turn enables frequent protocol upgrades. Additionally, according to further non-limiting embodiments, the invention enables the target BS to configure a new radio configuration that is unsupported by the source BS.

For the purposes of description of particular non-limiting embodiments of the invention, the following additional UMTS nomenclature is used: Radio Link Control (RLC) is a sub-layer of the radio interface that provides reliability; Transparent Mode (RLC-TM) is the transparent service in RLC, which functions include but are not limited to transfer of user data and segmentation and reassembly; Packet Data Convergence Protocol (PDCP) is used in UMTS to format the data into a suitable structure prior to transfer over the air interface; Serving Radio Network Subsystem (SRNS) refers to the fact that there is one SRNS for each UE that has a connection to the UTRAN, and which controls the RRC connection between a UE and the UTRAN; and COUNT-C is a ciphering sequence number in the UMTS encryption algorithm, which is updated sequentially for each plaintext block. While various embodiments are described with respect to UMTS, UTRAN, or E-UTRAN, one having ordinary skill in the art would recognize that various modifications could be made without departing from the spirit of the disclosed invention. Thus, it should be understood that the description herein is but one of many embodiments that may be possible while keeping within the scope of the claims appended hereto.

Figure 4A:
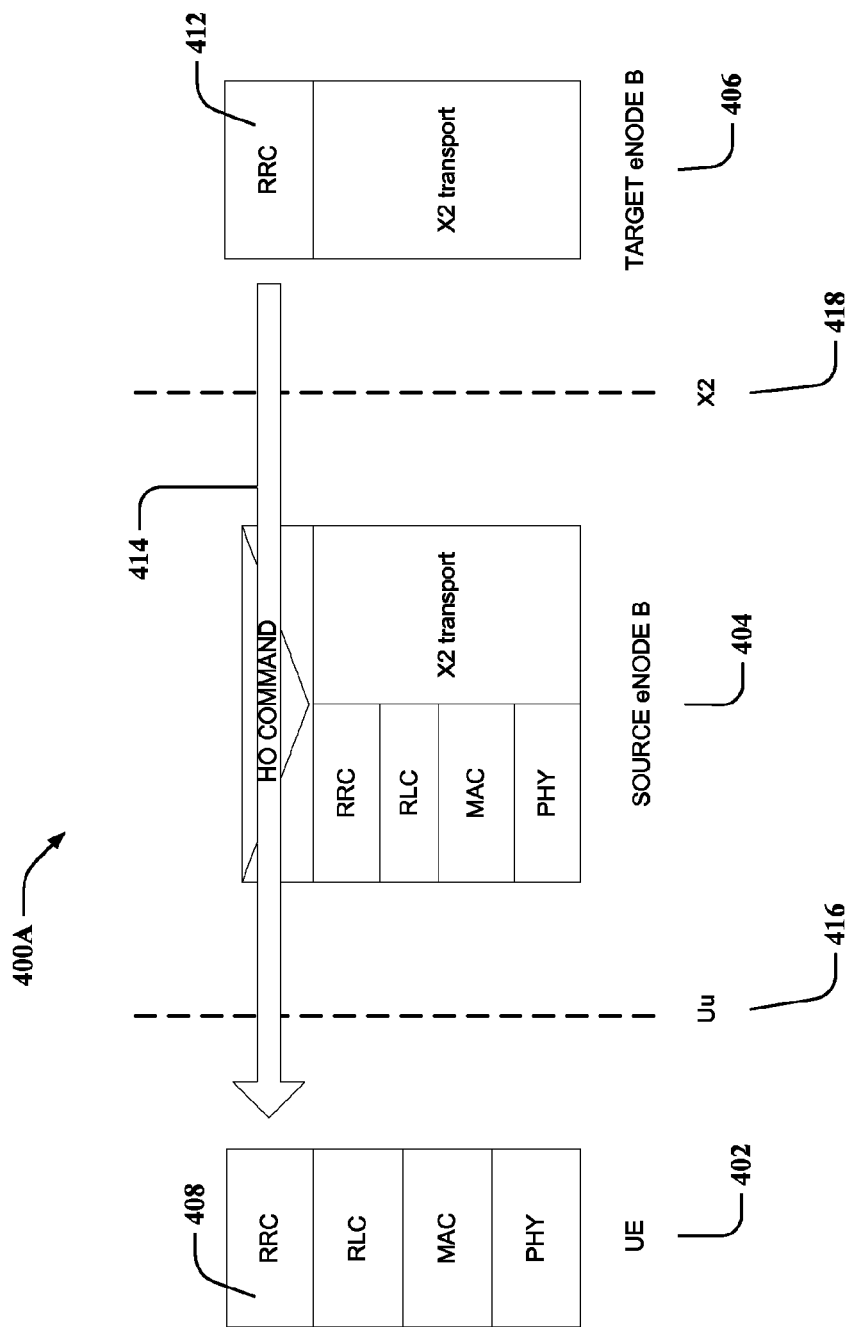
FIG. 4A illustrates an exemplary non-limiting high-level block diagram of a system that facilitates inter-eNode B handover, according to various aspects of the invention.

FIG. 4A illustrates an exemplary non-limiting high-level block diagram of a system that facilitates inter-eNode B handover, according to various aspects of the invention. The system 400A includes user equipment 402 that is communicatively coupled to a base station 404 (referred to as source eNode B) in a wireless manner. User equipment 402 can be mobile in nature, such that quality associated with signals received from base station 404 can vary as UE 402 translates within a geographic region requiring inter-eNode B handover to a target eNode B 406. According to various nonlimiting embodiments of the invention, a HO Command message 414 can be created by the target eNB 406 and can be forwarded by the RRC in the source eNB 404. According to further non-limiting embodiments, the HO Command message 414 can be encapsulated into an appropriate RRC message (e.g., a RRC direct transfer) by the source eNB 404. Advantageously, the source eNB 404 does not require the ability to understand all the contents in the HO Command message 414. Thus, source eNB 404 can minimally require only the ability to identify the HO Command message 414 as a HO Command message, according to various embodiments. In further embodiments, the source eNB 404 can include the ability to discern the HO Command message destination. Additionally, according to further non-limiting embodiments, the invention enables the target eNB 406 to configure a new radio configuration that is unsupported by the source eNB 404.

Figure 4B:
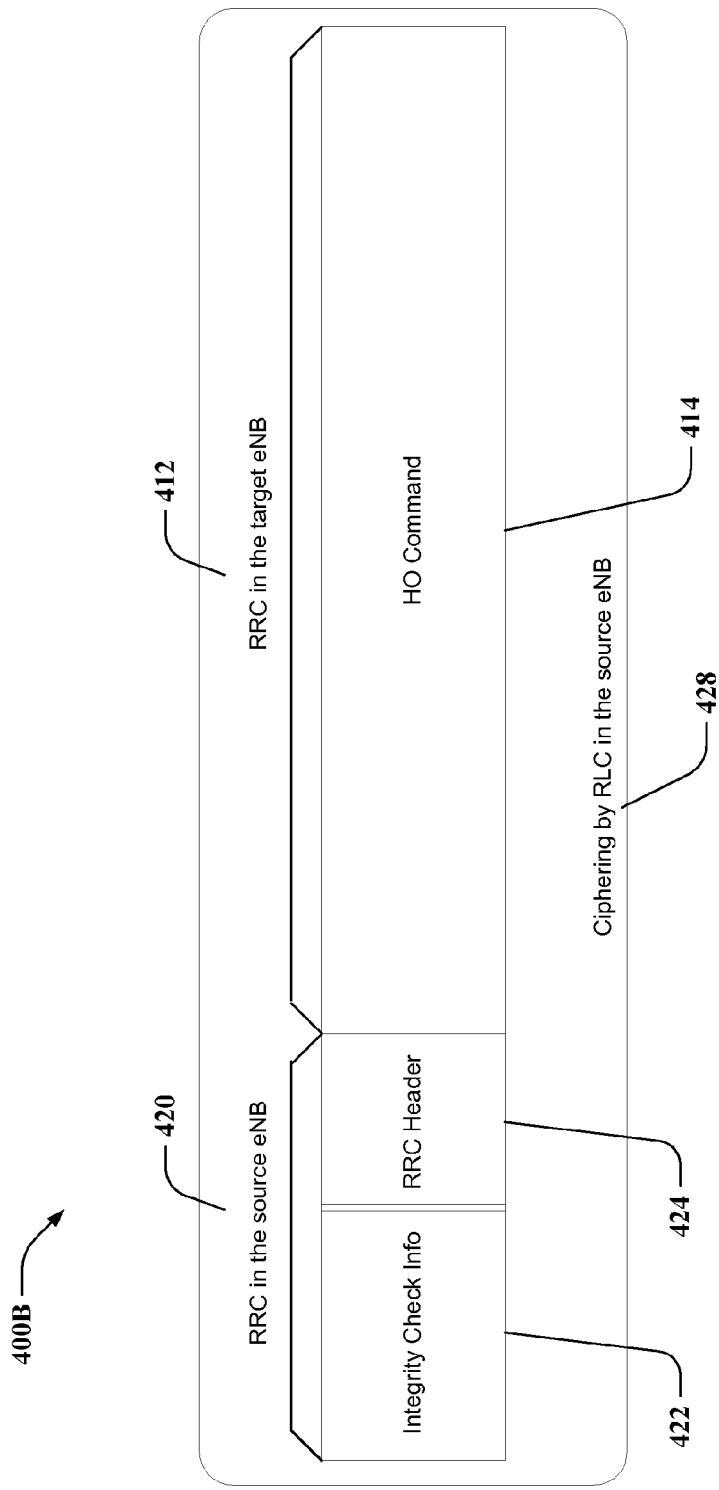
FIG. 4B illustrates an exemplary non-limiting HO Command message structure for inter-eNode B handover, according to various aspects of the invention.

FIG. 4B illustrates an exemplary non-limiting HO Command message structure for inter-eNode B handover, according to various aspects of the invention. As briefly described, the HO Command message (414) can be encapsulated into an appropriate RRC message 400B (e.g., a RRC direct transfer) by the source eNB 404 and forwarded to the UE 402. For example, the HO Command message 426 from the target eNB 406 can be encapsulated into the source eNB RRC message 406, wherein the HO command message 412 remains self-decodable, according to various aspects of the invention. According to further aspects of the invention, integrity protection 422 and ciphering 428 can be performed by the source eNB 404 based on a pre-existing security relationship between the source eNB 404 and a mobile device associated with the HO command message. Advantageously, the method does not require a new security association between the UE and the target node. For example, an existing security association can be provided by any one or more of existing radio interface layers, sublayers, protocols, and/or the like, or any combination thereof (e.g., RLC, PDCP, etc.). As a further example, an RRC header 424 comprising information (e.g., message discriminator, transaction identifier, and the like) can be added by the source eNB 404. According to various aspects of the present invention, the provided message structure 400B advantageously enables usage of a new version radio configuration of the target eNode B 406 even if the source eNB 404 does not support the corresponding protocol version. As a result, mobile operators can benefit from frequent protocol upgrades, including physical layer upgrades.

Figure 4C:
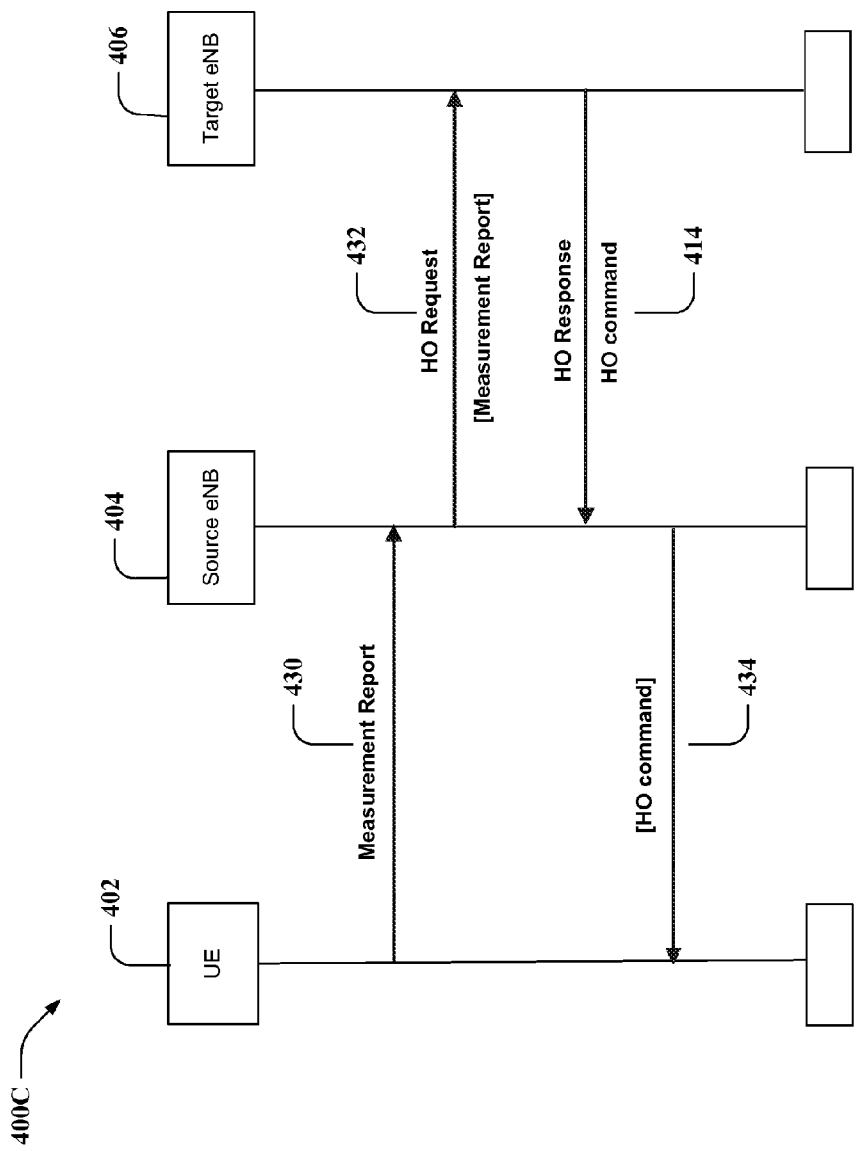
FIG. 4C illustrates an exemplary non-limiting signaling flow for inter-eNB handover, according to various aspects of the invention.

FIG. 4C illustrates an exemplary non-limiting signaling flow for inter-eNB handover, according to various aspects of the invention. As described, the HO Command message 414 can be encapsulated 434 into an appropriate RRC message 400B (e.g., a RRC direct transfer) by the source eNB 404 and forwarded 434 to the UE 402. In addition, according to further non-limiting embodiments of the invention, a Measurement Report message can be encapsulated 432 into an inter-node message (e.g., an inter-eNodeB message) and forwarded to the target eNB 406 by the source eNB 404, where brackets "[ ]" indicate the encapsulation of the respective messages (432 434). Because E-UTRAN RRM is more distributed than that of UTRAN, the source eNB 404 may not have accurate knowledge of the RRM situation of the target eNB 406. Thus, the disclosed mechanisms provide further optimized inter-eNB mobility by allowing target eNB 406 processing of Measurement Reports 430 from the UE 402, rather than source eNB processing (e.g., where the source eNB 404 only looks at the best cell indicated by the UE 402). Advantageously, given the complete contents of the Measurement Report at the target eNB 406, the provided mechanisms enable the target eNB 406 to make the best handover decision based on the most accurate RRM information. As a result, the typical message exchange in an inter-eNB handover can be described as occurring between the UE 402 and the target eNB 406 from a logical view point. According to various non-limiting embodiments, the provided message forwarding mechanism advantageously eliminates the need for complicated coordination between the source eNB 404 and the target eNB 406, as well as the resultant interoperability problems between vendors and protocol versions.

As a further advantage, protocol termination between UE 402 and the target eNB 406 can enable elimination of the UMTS HO Complete message for LTE, which allows for relatively more simple protocol implementations. Experience shows that relying on HO Complete messages sometimes leads to unstable protocol behaviors. Indeed, some procedures in UMTS rely on the L2-ACK for the complete message. According to further aspects of the invention, this may be avoided for LTE by placing additional or supplemental information (e.g., UTRAN XX_complete message information such as RRC transaction identifier, activation time for integrity protection in UL, ciphering activation time for Radio Bearer (RB) using RLC-TM, PDCP sequence number info to support lossless SRNS relocation, START values for COUNT-C initialization (SRNS relocation)) in a HO Command message or in a Measurement Report message as described below. As such, UE 402 completion of the physical part of the handover can be obtained by L1/L2 signaling (e.g., as part of random access in the target cell).

For purposes of illustration, various UTRAN XX_complete message information has been described for optional and additional or supplemental inclusion in a HO Command or Measurement Report message to facilitate, create, generate, execute, or otherwise a handover complete event, function, indication, indicator, or otherwise in the wireless communication system. However, it should be appreciated that such descriptions should not be construed as being necessary to or limiting the claims appended hereto. As a result, without deviating from the scope of the present invention, depending on particular implementation details or design considerations, such information may or may not be included in a HO Command or Measurement Report message depending at least on one or more on the following considerations. For example, RRC transaction identifier may be more useful when a response message from the UE is XX_Failure, so that the network knows in which configuration the UE has failed. For successful cases, this information is not as relevant, unless the network initiates convoluted reconfigurations. As a further example, activation time for integrity protection in UL and START values for COUNT-C initialization (SRNS relocation) may be determined by the network and included in the HO Command message. In any event, this may be desirable for the simplicity of the security procedure in LTE. In addition, ciphering activation time for Radio Bearer (RB) using RLC-TM is probably not relevant any more in LTE due to ciphering for RLC-TM relying on RLC sequence number not envisioned for LTE. Furthermore, PDCP sequence number info from the UE may not be required to support lossless SRNS relocation. As a result, the present invention advantageously enables elimination of the potentially redundant or unnecessary HO Complete message in LTE allowing from minimal protocol complexity.

Figure 5:
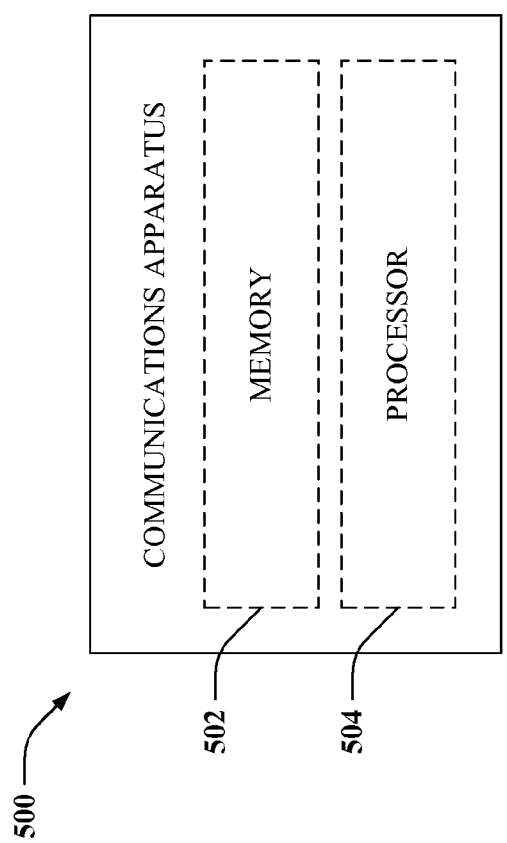
FIG. 5 illustrates a communications apparatus for employment within a multiple access wireless communications environment according to various aspects of the invention.

Now referring to FIG. 5, a communications apparatus 500 for employment within a wireless communications environment is illustrated. The apparatus 500 can be a base station 304 or a portion thereof or user equipment 302 or a portion thereof (such as a secure digital (SD) card coupled to a processor). Apparatus 500 can include a memory 502 that retains various instructions with respect to signal processing, scheduling communications, requesting measurement gaps, and/or the like. For instance, if apparatus 500 is user equipment as described below in connection with FIGS. 11-12 and 15, memory 502 can include instructions for transmitting a measurement report message to a source node for source node encapsulation into an inter-node message (e.g., an inter-eNodeB message) and forwarding to a target node. Memory 502 can can further include instructions for receiving a source node encapsulated handover command message forwarded from the target node, in accordance with various aspects of the invention. Further, memory 502 can include instructions for processing supplemental information included in the encapsulated handover command message to facilitate generating a handover complete indication. To that end, memory 502 can include instructions for appending additional information to the measurement report message to facilitate generating the handover complete indication. The above example instructions and other suitable instructions can be retained within memory 502, and a processor 504 can be utilized in connection with executing the instructions (depending upon, for instance, measurement report comparison, outcomes of handover decisions, receipt of a handover command, etc.).

Also, as stated above, apparatus 500 can be a base station and/or a portion thereof as described below in connection with FIGS. 9-10 and 14. Base stations typically perform the roll of a source node or a target node depending on the particular circumstances of the UE with respect to various node Bs. As a source node example, memory 502 can include instructions for receiving a handover command created by a target base station, and for encapsulating the handover command into a Radio Resource Control message, according to various aspects described herein. Memory 502 can additionally include instructions for enciphering an encapsulated handover command utilizing a pre-existing security relation between a mobile device associated with the handover command and the source node, and for appending one or more of integrity protection information and a Radio Resource Control header, in accordance with further aspects of the invention. In addition, memory 502 can further include instructions for facilitating transmitting an encapsulated handover command to the mobile device. As a target node example, memory 502 can include instructions for receiving and processing a measurement report message, according to various aspects described herein. Memory 502 can additionally include instructions for processing additional information included in the measurement report message for creating a handover complete indication, in accordance with further aspects of the invention. In addition, memory 502 can further include instructions for determining, by the target node, a handover decision concerning a wireless terminal associated with the measurement report message. Moreover, memory 502 can include instructions for transmitting a handover command message to the wireless terminal, by the target node, wherein the handover command message includes supplemental information to facilitate creating the handover complete indication. Processor 504 can be employed to execute instructions retained within memory 502. While several examples have been provided, it is understood that instructions described in the form of methodologies (e.g., FIGS. 6-7) can be included within memory 502 and executed by processor 504.

Figure 6:
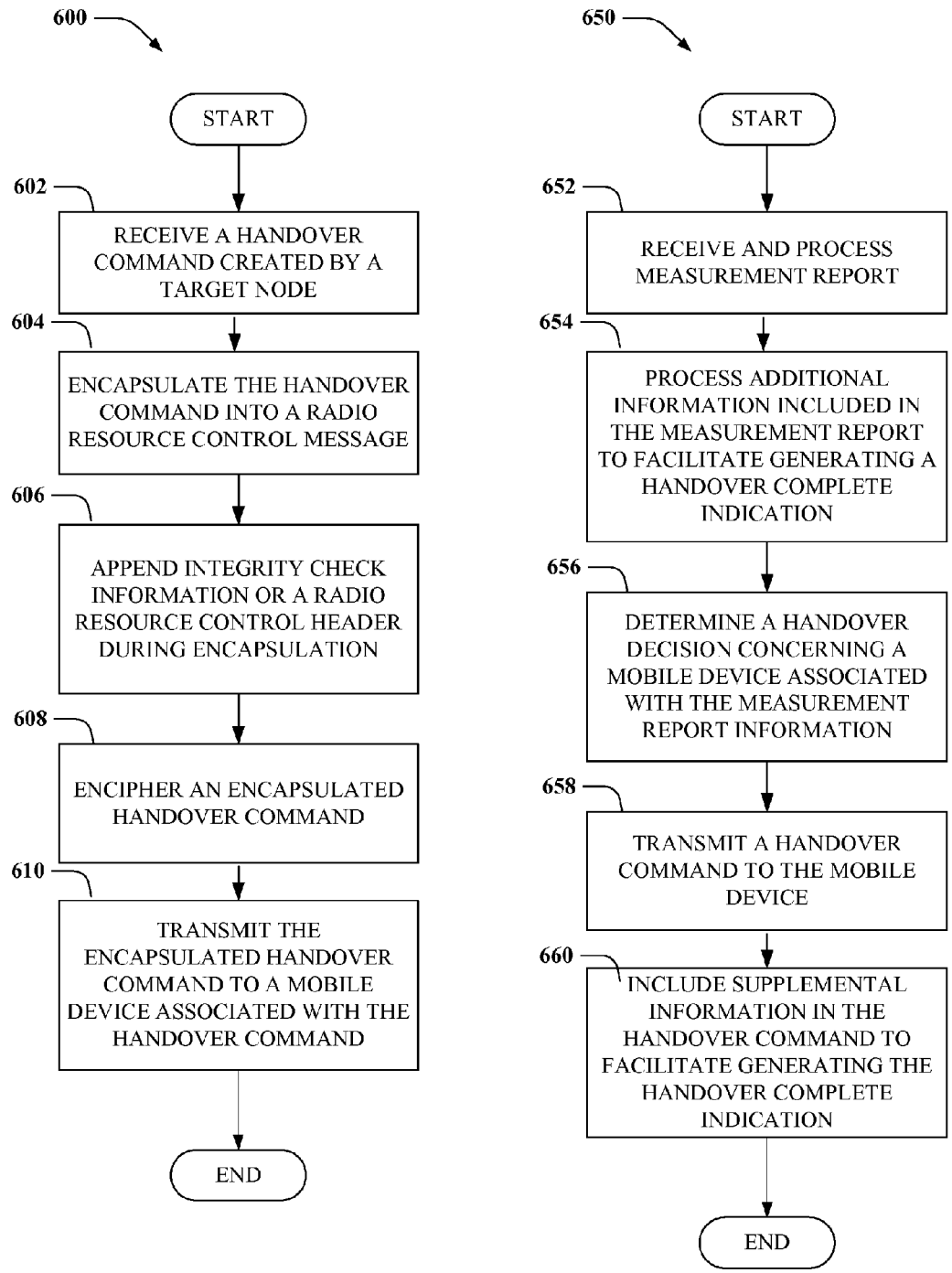
FIG. 6 illustrates exemplary non-limiting high-level methodologies for inter-eNode B handover in accordance with various embodiments described herein.
Figure 7:
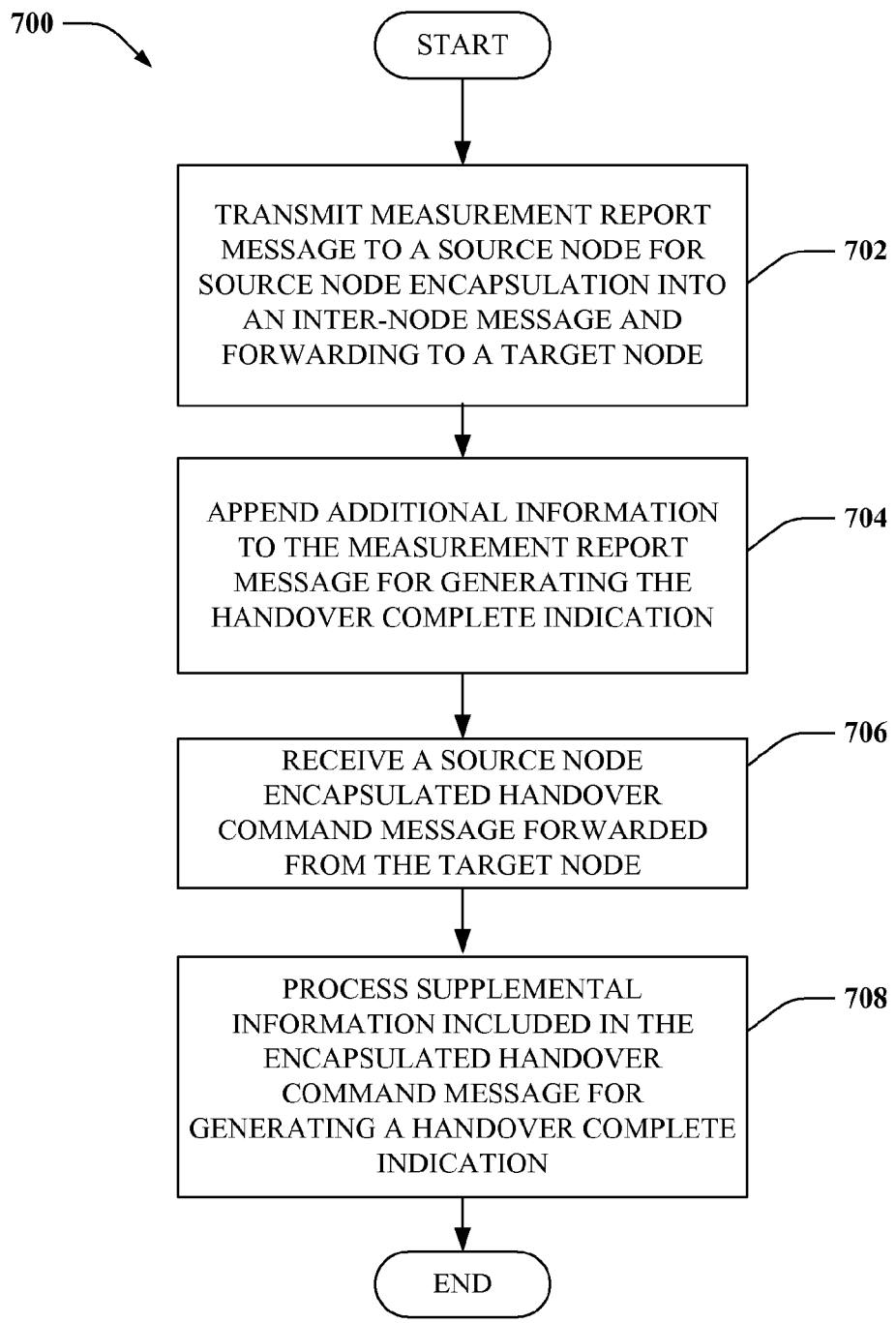
FIG. 7 illustrates a further exemplary high-level methodology for inter-eNode B handover in accordance with various embodiments described herein.

Referring to FIGS. 6 and 7, particular high-level methodologies for inter-eNode B handover in accordance with various embodiments are illustrated. While, for purposes of simplicity of explanation, the methodologies are shown and described as a series of acts, it is to be understood and appreciated that the methodologies are not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

FIG. 6 illustrates exemplary non-limiting high-level methodologies for inter-eNode B handover in accordance with various embodiments described herein. As described above, base stations can typically perform the roll of a source node or a target node depending on the particular circumstances of the UE with respect to various node Bs. As a result, methodologies are described with regard to the inter-eNode B handover in the context of a source node and a target node. For example, one methodology 600 can comprise receiving in a source node a handover command message created by a target node at 602. At 604, the handover command message can be encapsulated into a Radio Resource Control message which can also include appending integrity check information or an RRC header by the source node at 606. At 608, the encapsulated handover command message can be enciphered based on a pre-existing security association between a UE associated with the handover command message and the source node. Then the encapsulated handover command message can be transmitted to a wireless terminal associated with the handover command message at 610. A further methodology 652 can comprise a target node receiving and processing a measurement report at 652. At 654, the target node can additionally process supplemental information included in the measurement report to facilitate generating a handover complete indication in the wireless communication system. At 656, the target node determines a handover decision concerning a mobile device associated with the measurement report and transmits a handover command to the mobile device at 658. In addition, the target can include supplemental information to facilitate generating a handover complete indication at 660.

FIG. 7 illustrates a further particular high-level methodology for inter-eNode B handover in accordance with various embodiments described herein. With regard to user equipment, one methodology can comprise transmitting a measurement report to a source node for source node encapsulation into an inter-node message (e.g., an inter-eNodeB message) and forwarding to a target node at 702. Additionally at 704, the UE can append additional information to the measurement report to facilitate generating a handover complete indication. At 706, a source node encapsulated handover command message forwarded from the target node can be received at the UE, which can process supplemental information included in the encapsulated handover command message to facilitate generating a handover complete indication at 608.

Figure 8:
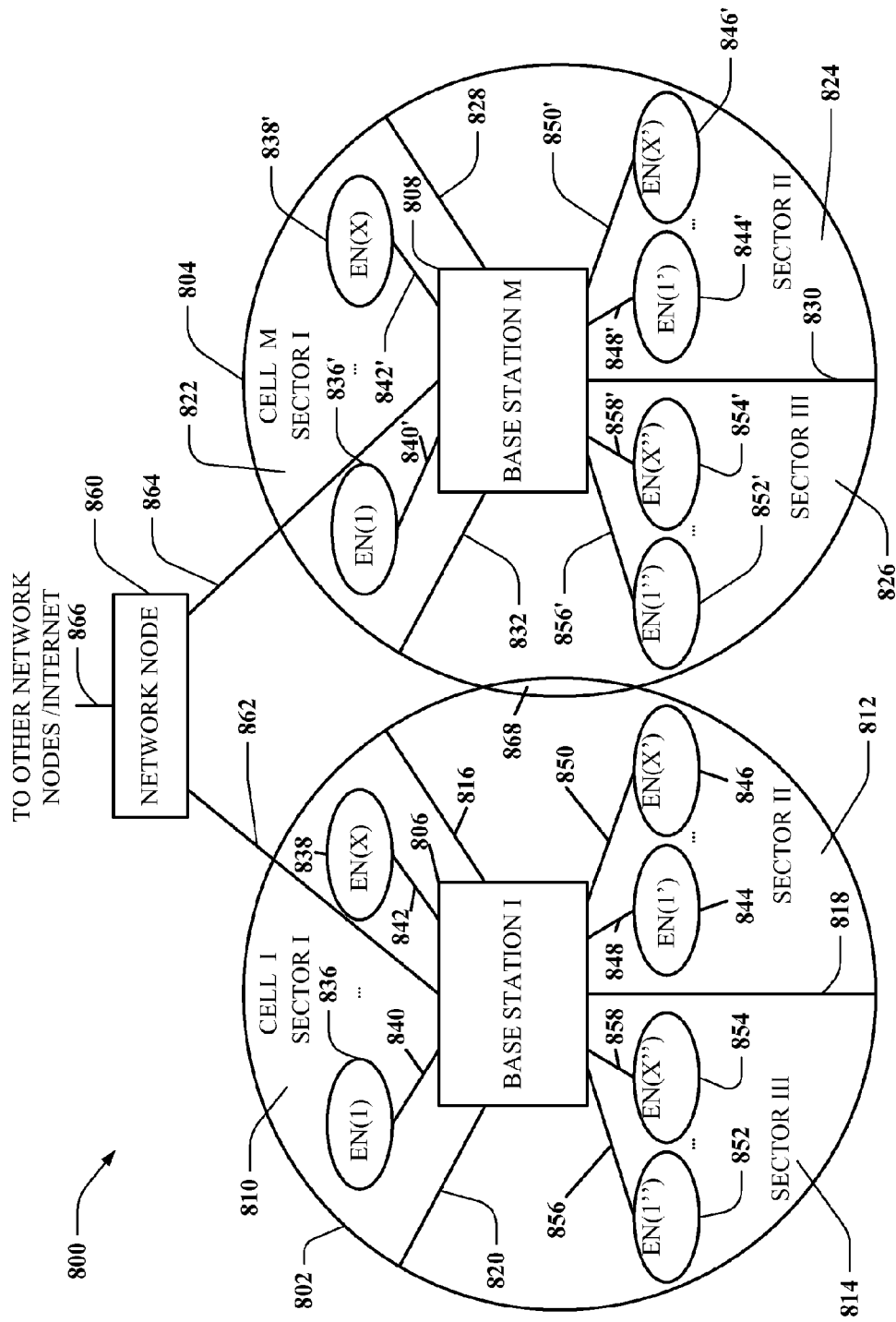
FIG. 8 illustrates an example communication system implemented in accordance with various aspects including multiple cells.

FIG. 8 depicts an example communication system 800 implemented in accordance with various aspects including multiple cells: cell I 802, cell M 804. Note that neighboring cells 802 and 804 overlap slightly, as indicated by cell boundary region 868, thereby creating potential for signal interference between signals transmitted by base stations in neighboring cells. Each cell 802 and 804 of system 800 includes three sectors. Cells which have not be subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Sector boundary regions provide potential for signal interference between signals transmitted by base stations in neighboring sectors. Line 816 represents a sector boundary region between sector I 810 and sector II 812; line 818 represents a sector boundary region between sector II 812 and sector III 814; line 820 represents a sector boundary region between sector III 814 and sector 1 810. Similarly, cell M 804 includes a first sector, sector I 822, a second sector, sector II 824, and a third sector, sector III 826. Line 828 represents a sector boundary region between sector I 822 and sector II 824; line 830 represents a sector boundary region between sector II 824 and sector III 826; line 832 represents a boundary region between sector III 826 and sector I 822. Cell I 802 includes a base station (BS), base station I 806, and a plurality of end nodes (ENs) (e.g., wireless terminals) in each sector 810, 812, 814. Sector I 810 includes EN(1) 836 and EN(X) 838 coupled to BS 806 via wireless links 840, 842, respectively; sector II 812 includes EN(1') 844 and EN(X') 846 coupled to BS 806 via wireless links 848, 850, respectively; sector III 814 includes EN(1'') 852 and EN(X'') 854 coupled to BS 806 via wireless links 856, 858, respectively. Similarly, cell M 804 includes base station M 808, and a plurality of end nodes (ENs) in each sector 822, 824, 826. Sector I 822 includes EN(1) 836' and EN(X) 838' coupled to BS M 808 via wireless links 840', 842', respectively; sector II 824 includes EN(1') 844' and EN(X') 846' coupled to BS M 808 via wireless links 848', 850', respectively; sector 3 826 includes EN(1'') 852' and EN(X'') 854' coupled to BS 808 via wireless links 856', 858', respectively.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 can be, e.g., fiber optic cables. Each end node, e.g., EN(1) 836 can be a wireless terminal including a transmitter as well as a receiver. The wireless terminals, e.g., EN(1) 836 can move through system 800 and can communicate via wireless links with the base station in the cell in which the EN is currently located. The wireless terminals, (WTs), e.g., EN(1) 836, can communicate with peer nodes, e.g., other WTs in system 800 or outside system 800 via a base station, e.g., BS 806, and/or network node 860. WTs, e.g., EN(1) 836 can be mobile communications devices such as cell phones, personal data assistants with wireless modems, etc. Respective base stations or portions thereof can perform the various source and target node methodologies described herein with respect to inter-e Node B handover and generating a handover complete indication. The wireless terminals or portions thereof can use the provided mechanisms to facilitate inter-e Node B handover and generating a handover complete indication according to the various aspects provided herein.

Figure 9:
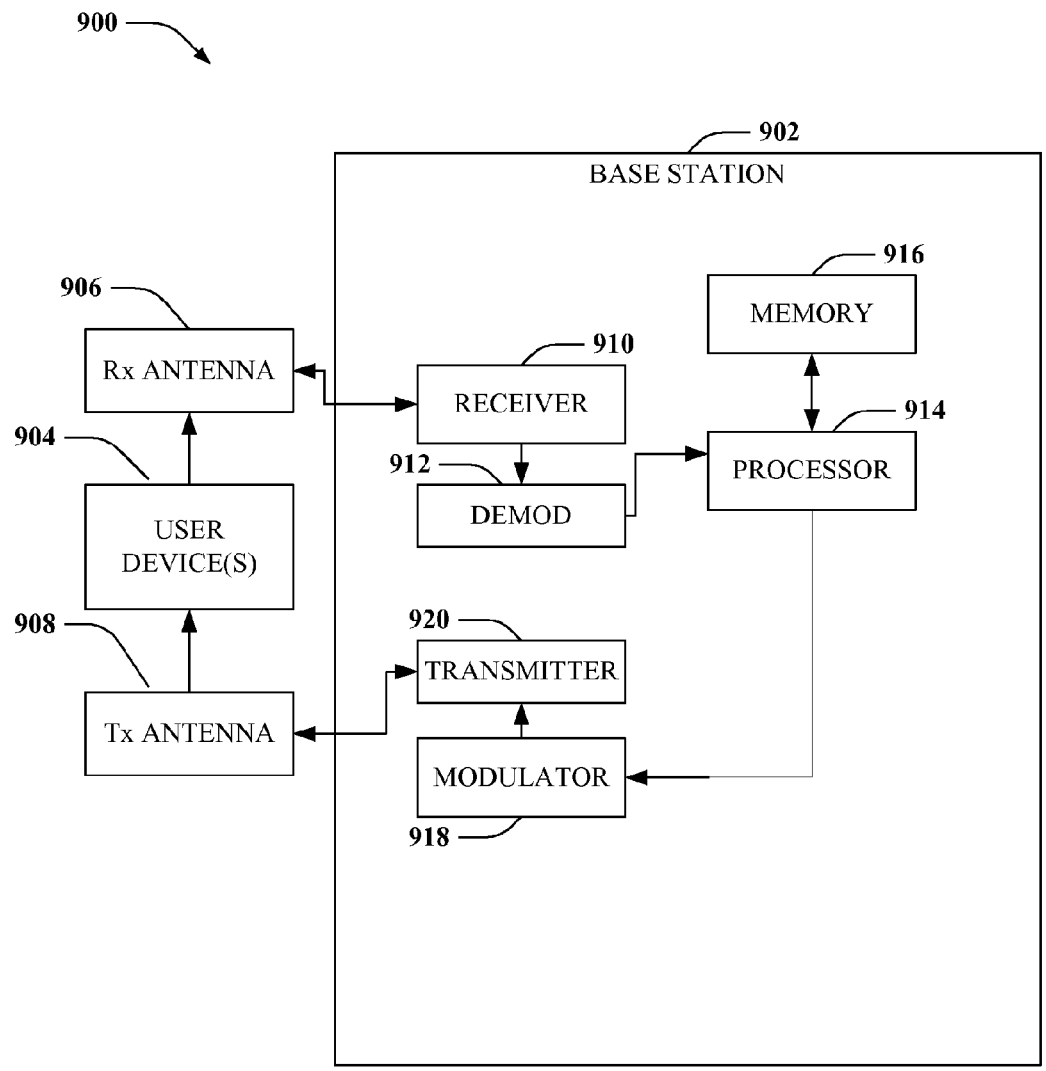
FIG. 9 illustrates a system that can be utilized in connection with inter-eNode B handover mechanisms in accordance with various embodiments.

FIG. 9 illustrates a system that can be utilized in connection with inter-eNB handover mechanisms. System 900 comprises a base station 902 with a receiver 910 that receives signal(s) from one or more user devices 904 by way of one or more receive antennas 906, and transmits to the one or more user devices 904 through a plurality of transmit antennas 908. In one example, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 914 similar to processor 1106 described below with regard to FIG. 11, and is coupled to a memory 916 that stores information related to user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Figure 10:
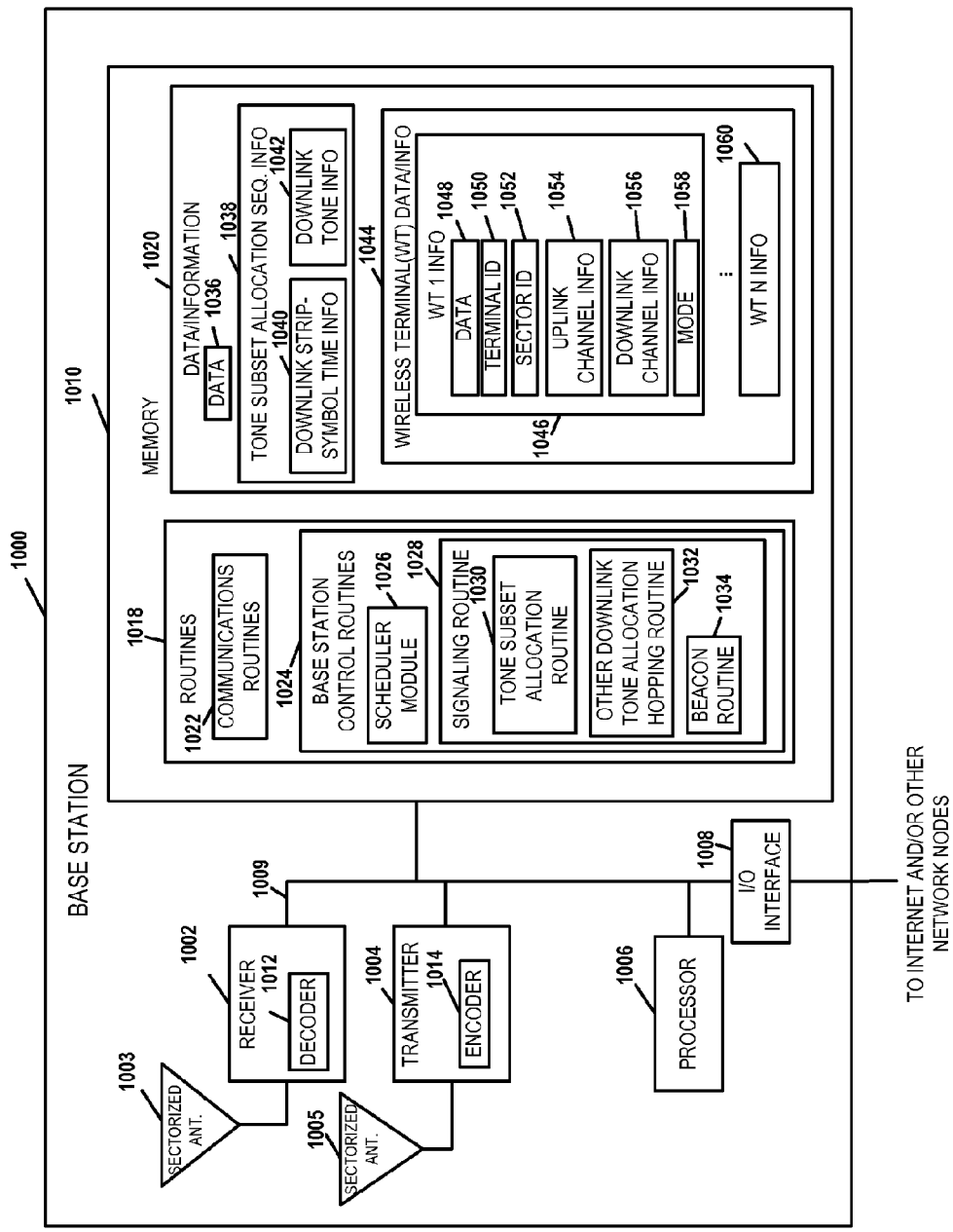
FIG. 10 illustrates an exemplary non-limiting block diagram of a base station in accordance with various aspects of the invention.

FIG. 10 illustrates an example base station 1000 in accordance with various aspects of the present invention. Base station 1000 or portions thereof implements various aspect of the present invention. For example, base station 1000 can perform forwarding and encapsulation as well as issue handover commands, according to various aspects of the invention. Base station 1000 can be used as any one of base stations 806, 808 of the system 800 of FIG. 8. The base station 1000 includes a receiver 1002, a transmitter 1004, a processor 1006, e.g., CPU, an input/output interface 1008 and memory 1010 coupled together by a bus 1009 over which various elements 1002, 1004, 1006, 1008, and 1010 can interchange data and information.

Sectorized antenna 1003 coupled to receiver 1002 is used for receiving data and other signals, e.g., channel reports, from wireless terminals transmissions from each sector within the base station's cell and can comprise one or more receive antennas. Sectorized antenna 1005 coupled to transmitter 1004 is used for transmitting data and other signals, e.g., control signals, pilot signal, beacon signals, etc. to wireless terminals 1200 (see FIG. 12) within each sector of the base station's cell. In various aspects, base station 1000 can employ multiple receivers 1002 and multiple transmitters 1004, e.g., an individual receiver 1002 for each sector and an individual transmitter 1004 for each sector. Processor 1006, can be, e.g., a general purpose central processing unit (CPU). Processor 1006 controls operation of base station 1000 under direction of one or more routines 1018 stored in memory 1010 and implements the methods. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, tone subset allocation sequence information 1038 including downlink strip-symbol time information 1040 and downlink tone information 1042, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes a scheduler module 1026 and signaling routines 1028 including a tone subset allocation routine 1030 for strip-symbol periods, other downlink tone allocation hopping routine 1032 for the rest of symbol periods, e.g., non strip-symbol periods, and a beacon routine 1034.

Data 1036 includes data to be transmitted that will be sent to encoder 1014 of transmitter 1004 for encoding prior to transmission to WTs, and received data from WTs that has been processed through decoder 1012 of receiver 1002 following reception. Downlink strip-symbol time information 1040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1042 includes information including a carrier frequency assigned to the base station 1000, the number and frequency of tones, and the set of tone subsets to be allocated to the strip-symbol periods, and other cell and sector specific values such as slope, slope index and sector type.

Data 1048 can include data that WT1 1200 has received from a peer node, data that WT 1 1200 desires to be transmitted to a peer node, and downlink channel quality report feedback information. Terminal ID 1050 is a base station 1000 assigned ID that identifies WT 1 1200. Sector ID 1052 includes information identifying the sector in which WT1 1200 is operating. Sector ID 1052 can be used, for example, to determine the sector type. Uplink channel information 1054 includes information identifying channel segments that have been allocated by scheduler 1026 for WT1 1200 to use, e.g., uplink traffic channel segments for data, dedicated uplink control channels for requests, power control, timing control, number of active streams etc. Each uplink channel assigned to WT1 1200 includes one or more logical tones, each logical tone following an uplink hopping sequence according to various aspects of the present invention. Downlink channel information 1056 includes information identifying channel segments that have been allocated by scheduler 1026 to carry data and/or information to WT1 1200, e.g., downlink traffic channel segments for user data. Each downlink channel assigned to WT1 1200 includes one or more logical tones, each following a downlink hopping sequence. Mode information 1058 includes information identifying the state of operation of WT1 1200, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1028 controls the operation of receiver 1002 with its decoder 1012 and transmitter 1004 with its encoder 1014. The signaling routine 1028 is responsible for controlling the generation of transmitted data 1036 and control information. Tone subset allocation routine 1030 constructs the tone subset to be used in a strip-symbol period using the method of the aspect and using data/information 1020 including downlink strip-symbol time info 1040 and sector ID 1052. The downlink tone subset allocation sequences will be different for each sector type in a cell and different for adjacent cells. The WTs 1200 receive the signals in the strip-symbol periods in accordance with the downlink tone subset allocation sequences; the base station 1000 uses the same downlink tone subset allocation sequences in order to generate the transmitted signals. Other downlink tone allocation hopping routine 1032 constructs downlink tone hopping sequences, using information including downlink tone information 1042, and downlink channel information 1056, for the symbol periods other than the strip-symbol periods. The downlink data tone hopping sequences are synchronized across the sectors of a cell. Beacon routine 1034 controls the transmission of a beacon signal, e.g., a signal of relatively high power signal concentrated on one or a few tones, which can be used for synchronization purposes, e.g., to synchronize the frame timing structure of the downlink signal and therefore the tone subset allocation sequence with respect to an ultra-slot boundary.

Figure 11:
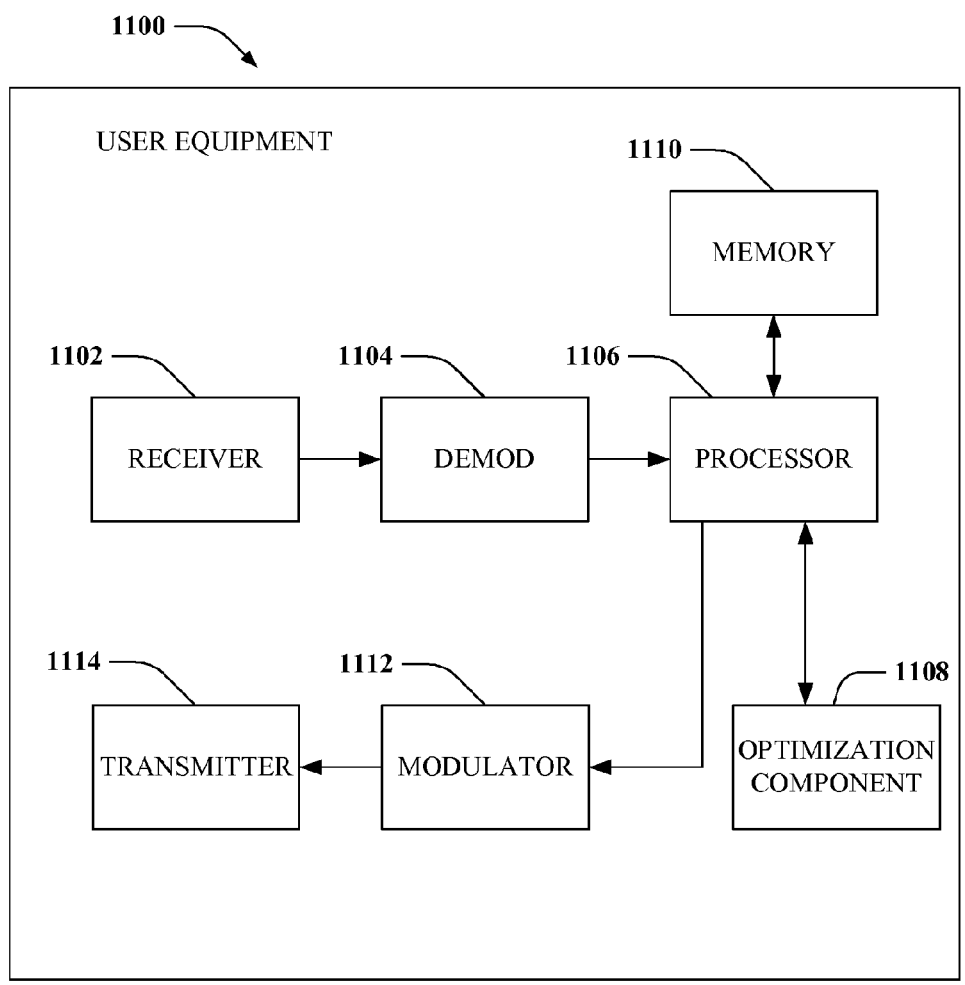
FIG. 11 illustrates a system that can be utilized in connection with inter-eNode B handover mechanisms in accordance with various embodiments.

FIG. 11 illustrates a system 1100 that can be utilized in connection with inter-eNode B handover mechanisms as described herein. System 1100 comprises a receiver 1102 that receives a signal from, for instance, one or more receive antennas, and performs typical actions thereon (e.g., filters, amplifies, downconverts, . . . ) the received signal and digitizes the conditioned signal to obtain samples. A demodulator 1104 can demodulate and provide received pilot symbols to a processor 1106 for channel estimation.

Processor 1106 can be a processor dedicated to analyzing information received by receiver component 1102 and/or generating information for transmission by a transmitter 1114. Processor 1106 can be a processor that controls one or more portions of system 1100, and/or a processor that analyzes information received by receiver 1102, generates information for transmission by a transmitter 1114, and controls one or more portions of system 1100. System 1100 can include an optimization component 1108 that can optimize performance of user equipment before, during, and/or after performance of measurements with respect to one or more technologies and/or frequencies. Optimization component 1108 can be incorporated into the processor 1106. It is to be appreciated that optimization component 1108 can include optimization code that performs utility based analysis in connection with requesting measurement gaps. The optimization code can utilize artificial intelligence based methods in connection with performing inference and/or probabilistic determinations and/or statistical-based determination in connection with encoding and decoding schemes.

System (user equipment) 1100 can additionally comprise memory 1110 that is operatively coupled to processor 1106 and that stores information such as measurement gap information, scheduling information, and the like, wherein such information can be employed in connection with allocating requesting measurement gaps and performing measurements during a measurement gap. Memory 1110 can additionally store protocols associated with generating lookup tables, etc., such that system 1100 can employ stored protocols and/or algorithms to increase system capacity. It will be appreciated that the data store (e.g., memories) components described herein can be either volatile memory or nonvolatile memory, or can include both volatile and nonvolatile memory. By way of illustration and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 is intended to comprise, without being limited to, these and any other suitable types of memory. Processor 1106 is connected to a symbol modulator 1112 and transmitter 1114 that transmits the modulated signal.

Figure 12:
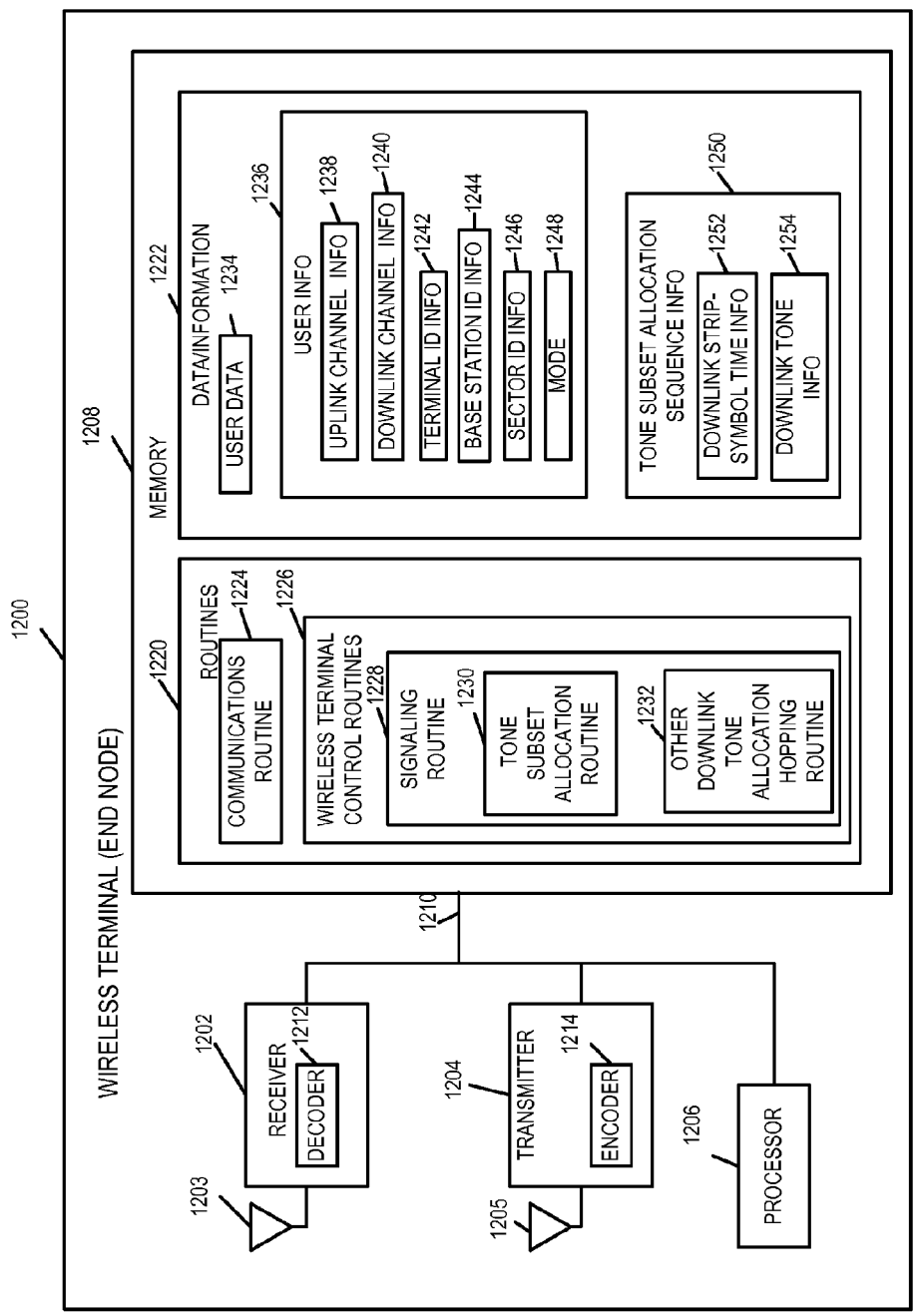
FIG. 12 illustrates an exemplary wireless terminal (e.g., wireless terminal, mobile device, end node, . . . ) implemented in accordance with various embodiments.

FIG. 12 illustrates an exemplary wireless terminal (e.g., end node, mobile device, . . . ) 1200 which can be used as any one of the wireless terminals (e.g., EN(1) 836, of the system 800 shown in FIG. 8). Wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. Antenna 1203 used for receiving signals from a base station is coupled to receiver 1202. Antenna 1205 used for transmitting signals, e.g., to a base station is coupled to transmitter 1204. As described above, it is to be appreciated that various modifications are possible. The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250, in the example case of an OFDMA communication system. User data 1234 can include data, intended for a peer node, which can be routed to encoder 1214 for encoding prior to transmission by transmitter 1204 to base station 1000, and data received from the base station 1000 which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by base station 1000 for wireless terminal 1200 to use when transmitting to the base station 1000. Uplink channels can include uplink traffic channels, dedicated uplink control channels, e.g., request channels, power control channels and timing control channels. In the example case of an OFDMA communication system, each uplink channel includes one or more logic tones, each logical tone following an uplink tone hopping sequence. In some embodiments, the uplink hopping sequences are different between each sector type of a cell and between adjacent cells.

Downlink channel information 1240 includes information identifying downlink channel segments that have been assigned by a base station to WT 1200 for use when the base station is transmitting data/information to WT 1200. Downlink channels can include downlink traffic channels and assignment channels, each downlink channel including one or more logical tone, each logical tone following a downlink hopping sequence, which is synchronized between each sector of the cell.

User info 1236 also includes terminal ID information 1242, which is a base station 1000 assigned identification, base station ID information 1244 which identifies the specific base station 1000 that WT has established communications with, and sector ID info 1246 which identifies the specific sector of the cell where WT 1200 is presently located. In an example OFDMA communication system, base station ID 1244 provides a cell slope value and sector ID info 1246 provides a sector index type; the cell slope value and sector index type can be used to derive tone hopping sequences. Mode information 1248 also included in user info 1236 identifies whether the WT 1200 is in sleep mode, hold mode, or on mode.

In some OFDMA embodiments, tone subset allocation sequence information 1250 includes downlink strip-symbol time information 1252 and downlink tone information 1254. Downlink tone info 1254 includes information including a carrier frequency assigned to the base station 1000, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. In some OFDMA embodiments, tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some embodiments and process received data transmitted from base station 1000.

Figure 13:
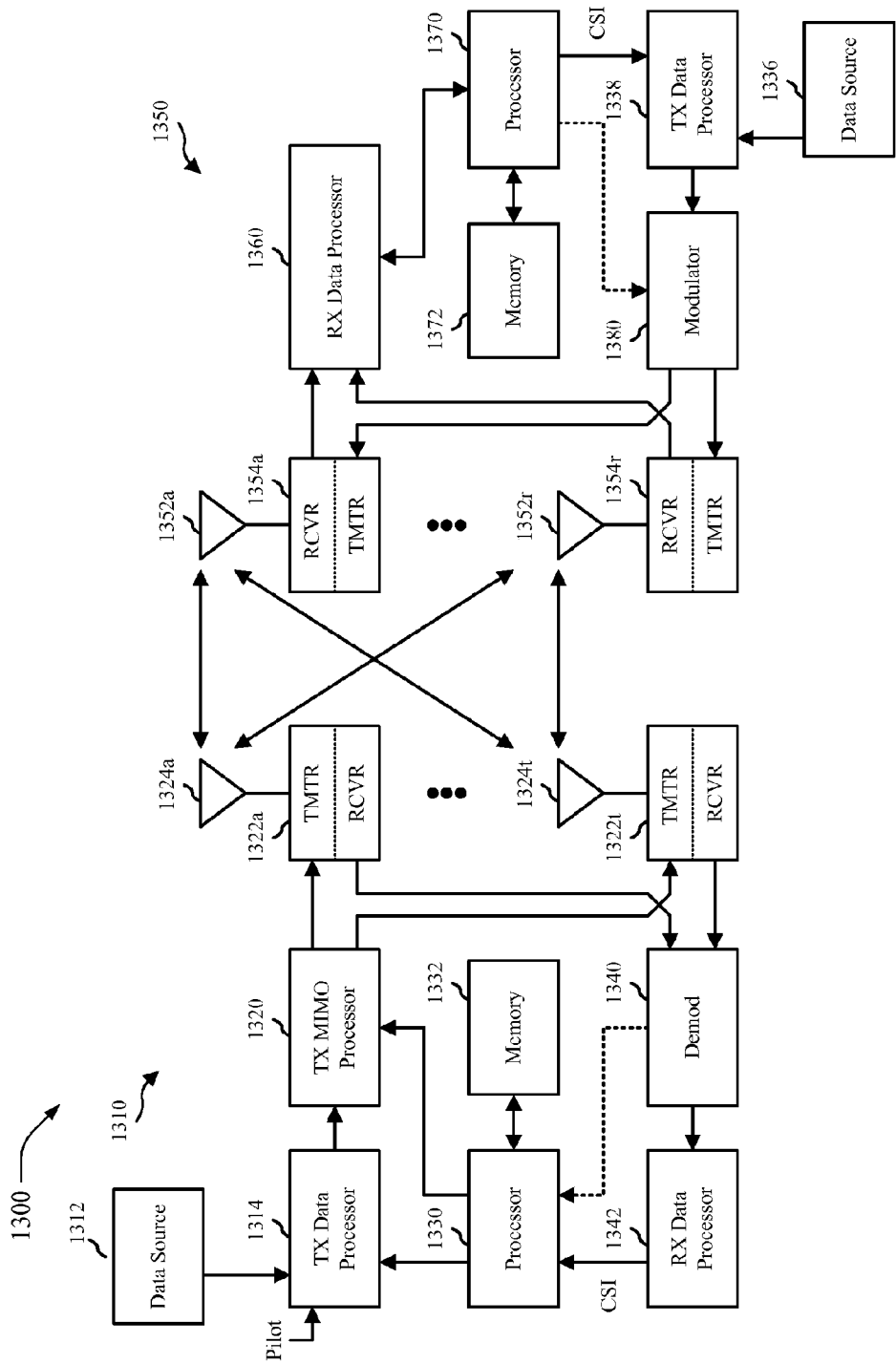
FIG. 13 illustrates an exemplary non-limiting block diagram of a communication system incorporating inter-eNode B handover mechanisms in accordance with various aspects of the invention.

FIG. 13 illustrates an exemplary non-limiting block diagram of a communication system suitable for incorporating inter-eNode B handover mechanisms in accordance with various aspects of the invention, where a transmitter system 1310 (e.g., base station, access point, etc.) and a receiver system 1350 (access terminal, user equipment, mobile node, etc.) are in wireless communication in a MIMO system 1300. At the transmitter system 1310, traffic data for a number of data streams is provided from a data source 1312 to a transmit (TX) data processor 1314. In an embodiment, each data stream is transmitted over a respective transmit antenna. TX data processor 1314 formats, codes, and interleaves the traffic data for each data stream based on a particular coding scheme selected for that data stream to provide coded data. In accordance with various embodiments of the invention, transmitter system 1310 facilitates inter-eNode B handover by forwarding to the receiver system 1350 the encapsulated handover commands.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1330.

The modulation symbols for all data streams are then provided to a TX MIMO processor 1320, which may further process the modulation symbols (e.g., for OFDM). TX MIMO processor 1320 then provides $N_T$ modulation symbol streams to $N_T$ transmitters (TMTR) 1322a through 1322t. In certain embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1322a through 1322t are then transmitted from $N_T$ antennas 1324a through 1324t, respectively.

At receiver system 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective received signal, digitizes the conditioned signal to provide samples, and further processes the samples to provide a corresponding "received" symbol stream.

An RX data processor 1360 then receives and processes the $N_R$ received symbol streams from $N_R$ receivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by RX data processor 1360 is complementary to that performed by TX MIMO processor 1320 and TX data processor 1314 at transmitter system 1310.

A processor 1370 periodically determines which pre-coding matrix to use. Processor 1370 formulates a reverse link message comprising a matrix index portion and a rank value portion. The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to extract the reverse link message transmitted by the receiver system 1350. Processor 1330 then determines which pre-coding matrix to use for determining the beamforming weights then processes the extracted message. According to various aspects of the invention, the transmitter system 1310 can, among other aspects of the invention, receive, encapsulate, and forward measurement reports from the receiver system 1350.

Figure 14:
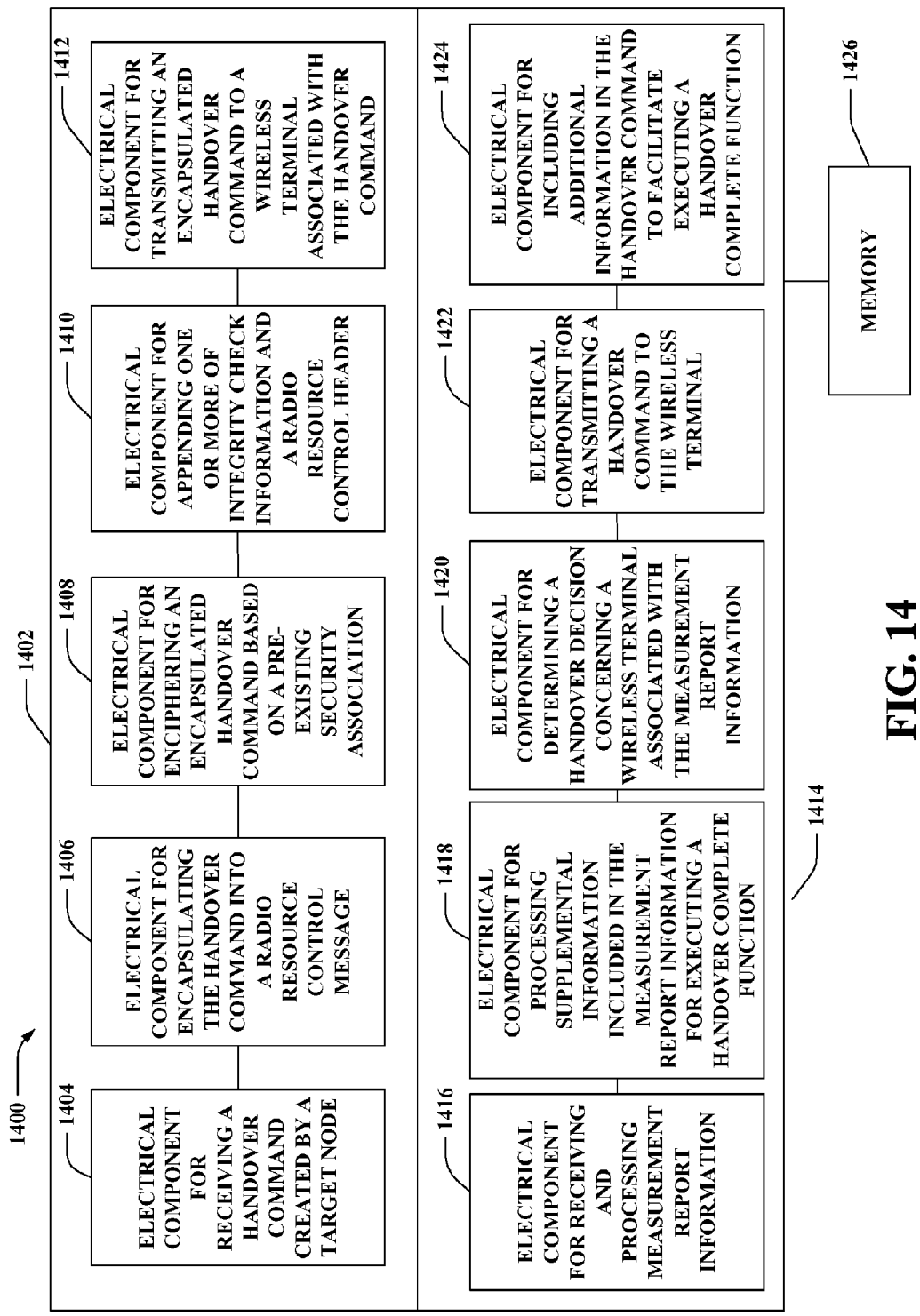
FIG. 14 illustrates an exemplary non-limiting apparatus that enables inter-eNode B handover according to various embodiments of the invention.

With reference to FIG. 14, illustrated is an apparatus 1400 that facilitates inter-eNode B handover according to various non-limiting embodiments of the invention. For example, apparatus 1400 may reside at least partially within a base station. It is to be appreciated that apparatus 1400 is represented as including functional blocks, which may be functional blocks that represent functions implemented by a processor, software, or combination thereof (e.g., firmware). In addition, because base stations typically perform the roll of a source node or a target node depending on the particular circumstances of the UE with respect to various node Bs, functionality of a base station can include that functionality required for both target and source node operations. For example, apparatus 1400 includes a logical grouping 1402 of electrical components that can act in conjunction. For instance, source node logical grouping 1402 can include an electrical component 1404 for receiving a handover command created by a target node. Further, logical grouping 1402 can include an electrical component 1406 for encapsulating the handover command into a Radio Resource Control message as described in further detail supra in connection with FIGS. 4-6. Logical grouping 1402 can further include electrical components for enciphering an encapsulated handover command based on a pre-existing security association between a wireless terminal associated with the handover command and a source node 1408, for appending one or more of integrity check information and a Radio Resource Control header 1410, and for transmitting an encapsulated handover command to a wireless terminal associated with the handover command 1412. As a further example, target node logical grouping 1414 can include an electrical component 1416 for receiving and processing measurement report information. Further, logical grouping 1414 can include an electrical component 1418 for processing supplemental information included in the measurement report information to facilitate executing a handover complete function. Logical grouping 1414 can further include electrical components for determining a handover decision concerning a wireless terminal associated with the measurement report information 1420, for transmitting a handover command to the wireless terminal 1422, and for including additional information in the handover command to facilitate executing a handover complete function 1424. Additionally, apparatus 1400 can include a memory 1426 that retains instructions for executing functions associated with the electrical components of logical groupings 1402 and 1414. While shown as being external to memory 1426, it is to be understood that one or more of electrical components of logical groupings 1402 and 1414 may exist within memory 1426.

Figure 15:
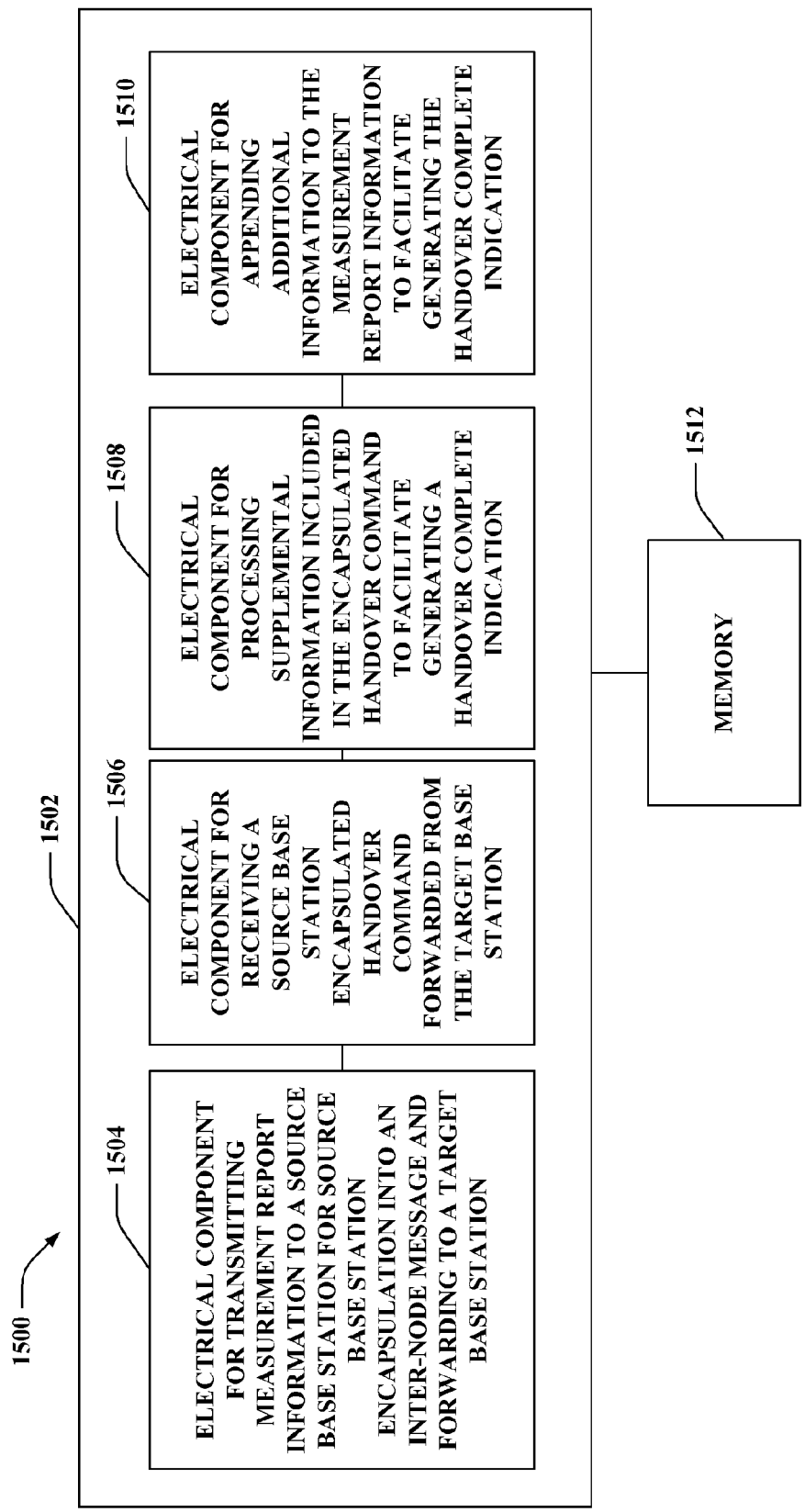
FIG. 15 illustrates an exemplary non-limiting apparatus that facilitates inter-eNode B handover according to various embodiments of the invention.

With reference to FIG. 15, illustrated is an apparatus 1500 that enables inter-eNode B handover according to various non-limiting embodiments of the invention. Apparatus 1500 may reside at least partially within a wireless terminal, for instance. It is to be appreciated that apparatus 1500 is represented as including functional blocks, which may be functional blocks that represent functions implemented by a processor, software, or combination thereof (e.g., firmware). Apparatus 1500 includes a logical grouping 1502 of electrical components that can act in conjunction. For instance, logical grouping 1502 can include an electrical component for transmitting measurement report information to a source base station for source base station encapsulation into an inter-node message (e.g., an inter-eNodeB message) and forwarding to a target base station 1504. Further, logical grouping 1502 can include an electrical component for receiving a source base station encapsulated handover command forwarded from the target base station 1506 as described in further detail supra in connection with FIGS. 4, 5, and 7. In addition, logical grouping 1502 can include an electrical component for processing supplemental information included in the encapsulated handover command to facilitate generating a handover complete indication 1508. Further, logical grouping 1502 can include an electrical component for appending additional information to the measurement report information to facilitate generating the handover complete indication 1510. Additionally, apparatus 1500 can include a memory 1512 that retains instructions for executing functions associated with electrical components 1504, 1506, 1508 and 1510. While shown as being external to memory 1512, it is to be understood that one or more of electrical components 1504, 1506, 1508 and 1510 may exist within memory 1512.

Various embodiments of the present invention are directed to an apparatus, e.g., a mobile node such as a mobile terminal, a base station, or a communications system which implement some embodiments. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of some embodiments.

Further embodiments are also directed to methods, e.g., method of controlling and/or operating mobile nodes, base stations and/or communications systems, e.g., hosts, in accordance with some embodiments. In various embodiments, nodes described herein are implemented using one or more modules to perform the steps corresponding to one or more methods of some embodiments, for example, message generation and/or transmission, message reception and/or processing, message encapsulation, etc. Thus, in some embodiments various features of some embodiments are implemented using modules. Such modules can be implemented using software, hardware or a combination of software and hardware as described below.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The method claims appended herein present elements of the various steps in a sample order, and are not meant to be limited to the specific order or hierarchy presented.

Still further embodiments are also directed to machine readable medium, e.g., ROM, RAM, CDs, hard discs, etc., which include machine readable instructions for controlling a machine, e.g., general purpose computer with or without additional hardware, to implement all or portions of the above described methods, e.g., in one or more nodes. Accordingly, among other things, some embodiments are directed to a machine-readable medium including machine executable instructions for causing a machine, e.g., processor and associated hardware, to perform one or more of the steps of the above-described method(s).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will be appreciated that, in accordance with one or more aspects described herein, inferences can be made regarding inter-eNode B handover. As used herein, the term to "infer" or "inference" refers generally to the process of reasoning about or inferring states of the system, environment, and/or user, mobile device, desired actions or events, and base station from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to comparing measurement reports. In accordance with another example, an inference may be made related to making handover decisions. It will be appreciated that the foregoing examples are illustrative in nature and are not intended to limit the number of inferences that can be made or the manner in which such inferences are made in conjunction with the various embodiments and/or methods described herein.

Those of skill would further appreciate that the various illustrative logical blocks, modules, circuits, and algorithm steps described in connection with the embodiments disclosed herein may be implemented as electronic hardware, computer software, firmware, middleware, microcode, or any combination thereof. To clearly illustrate this interchangeability, various illustrative components, blocks, modules, circuits, and steps have been described above generally in terms of their functionality. Whether such functionality is implemented as hardware, software, or otherwise depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the embodiments disclosed herein can be implemented or performed with a general purpose processor, a digital signal processor (DSP), an application specific integrated circuit (ASIC), digital signal processing devices (DSPDs), programmable logic devices (PLDs), field programmable gate arrays (FPGAs), processors, controllers, microcontrollers, microprocessors, discrete gate or transistor logic, discrete hardware components, or other electronic units, or any combination thereof designed to perform the functions described herein. Furthermore, a general purpose processor may be a microprocessor, but in the alternative, the processor may be any conventional processor, controller, microcontroller, or state machine. Additionally, a processor may also be implemented as a combination of computing devices (e.g., a combination of a DSP and a microprocessor, a plurality of microprocessors, one or more microprocessors in conjunction with a DSP core, or any other such configuration).

When the systems and/or methods described herein are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

The steps of a method or algorithm described in connection with the embodiments disclosed herein can be embodied directly in hardware, in software module (e.g., procedures, functions, and so on) executed by a processor, or in a combination of the two that perform the functions described herein. Software code can be stored in memory units and executed by processors. Software modules can reside in RAM memory, flash memory, ROM memory, EPROM memory, EEPROM memory, registers, hard disk, a removable disk, a CD-ROM, or any other form of storage medium known in the art. A memory unit can be implemented within the processor or external to the processor, in which case it can be communicatively coupled to the processor through various means. For example, an exemplary storage medium can be coupled to the processor such that the processor can read information from, and write information to, the storage medium. In the alternative, the storage medium can be integral to the processor. The processor and the storage medium can reside in an ASIC, which in turn can reside in a user terminal. In the alternative, the processor and the storage medium can reside as discrete components in a user terminal.

What has been described above includes embodiments of the disclosed subject matter to enable any person skilled in the art to make or use the present disclosure. It is, of course, not possible to describe every conceivable combination of components or methodologies for purposes of describing such subject matter. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communication system, the method comprising:
receiving, by a source base station, a handover command message created by a target base station for handover of a wireless terminal;
encapsulating, by the source base station, the handover command message into a source base station Radio Resource Control message with integrity protection information; and
forwarding the encapsulated handover command message, by the source base station, to the wireless terminal.

2. The method of claim 1, further comprising enciphering an encapsulated handover command message based on a pre-existing security association between a wireless terminal associated with the handover command message and the source base station.

3. The method of claim 1, the encapsulating further comprises appending the integrity protection information by the source base station.

4. The method of claim 1, the encapsulating further comprises appending a Radio Resource Control header.

5. The method of claim 4, the Radio Resource Control header includes at least one of a message discriminator and a transaction identifier.

6. A method used in a wireless communication system, the method comprising:
   receiving, by a target base station, measurement report information from a mobile device forwarded to the target base station by a source base station;
   processing, by the target base station, the measurement report information;
   determining, by the target base station, a handover decision concerning the mobile device associated with the measurement report information; and
   transmitting a handover command to the mobile device via the source base station, by the target base station, wherein the handover command is created by the target base station and forwarded to the mobile device by the source base station.

7. The method of claim 6, further comprising processing additional information included in the measurement report information to facilitate generating a handover complete indicator in the wireless communication system.

8. The method of claim 6, wherein the handover command includes supplemental information to facilitate generating a handover complete indicator in the wireless communication system.

9. A method for inter-node transfer in a wireless communication system, the method comprising:
   transmitting, by a mobile device, a measurement report message to a source node for source node encapsulation into an inter-node B message and forwarding to a target node; and
   receiving, by the mobile device, a source node encapsulated handover command message forwarded from the source node, wherein the source node encapsulated handover command message includes a handover command generated by the target node, wherein the handover command is created by the target node and encapsulated with integrity protection information and forwarded to the mobile device, by the source node.

10. The method of claim 9, further comprising processing, by the mobile device, supplemental information included in the encapsulated handover command message to facilitate generating a handover complete indicator in the wireless communication system.

11. The method of claim 9, further comprising appending additional information to the measurement report message to facilitate generating a handover complete indicator in the wireless communication system.

12. A communications apparatus, comprising:
   a memory that retains instructions for receiving, by a source base station, a handover command created by a target base station for a mobile device, for encapsulating, by the source base station, the handover command into a source base station Radio Resource Control message with integrity protection information, and for forwarding the encapsulated handover command message, by the source base station, to the mobile device; and
   a processor that is configured to execute the instructions within the memory.

13. The communications apparatus of claim 12, wherein the instructions for encapsulating further comprise instructions for enciphering an encapsulated handover command utilizing a pre-existing security relation between a mobile device associated with the handover command and the source base station.

14. The communications apparatus of claim 12, wherein the instructions for encapsulating further comprise instructions for appending one or more of the integrity protection information and a Radio Resource Control header.

15. The communications apparatus of claim 12, the memory further retains instructions for transmitting an encapsulated handover command to a mobile device.

16. A communications apparatus, comprising:
   a memory that retains instructions for receiving and processing, by a target base station, a measurement report message from a wireless terminal forwarded to the target base station by a source base station, for determining a handover decision concerning the wireless terminal associated with the measurement report message, and for transmitting a handover command to the wireless terminal via the source base station, wherein the handover command is created by the target base station and forwarded to the wireless terminal by the source base station; and
   a processor that is configured to execute the instructions within the memory.

17. The communications apparatus of claim 16, wherein the instructions for processing further comprise instructions for processing additional information included in the measurement report message for creating a handover complete indication.

18. The communications apparatus of claim 16, wherein the handover command message includes supplemental information to facilitate creating a handover complete indication.

19. A communications apparatus, comprising:
   a memory that retains instructions for transmitting a measurement report message to a source node for source node encapsulation into an inter-node message and forwarding to a target node, and for receiving a source node encapsulated handover command message forwarded from the source node, wherein the source node encapsulated handover command message includes a handover command generated by the target node, wherein the handover command is created by the target node and encapsulated with integrity protection information and forwarded to the communications apparatus, by the source node; and
   a processor that is configured to execute the instructions within the memory.

20. The communications apparatus of claim 19, the memory further retains instructions for processing supplemental information included in the encapsulated handover command message to facilitate generating a handover complete indication.

21. The communications apparatus of claim 19, the memory further retains instructions for appending additional information to the measurement report message to facilitate generating a handover complete indication.

22. A communications apparatus, comprising:
   means for receiving, by a source node, a handover command created by a target node for a wireless terminal;
   means for encapsulating, by the source node, the handover command into a source base station Radio Resource Control message with integrity protection information; and
   means for forwarding the encapsulated handover command, by the source node, to the wireless terminal.

23. The communications apparatus of claim 22, wherein the means for encapsulating further comprise means for enciphering an encapsulated handover command based on a preexisting security relation between the wireless terminal associated with the handover command and the source node.

24. The communications apparatus of claim 22, wherein the means for encapsulating further comprise means for appending one or more of the integrity protection information and a Radio Resource Control header.

25. A communications apparatus operable in wireless communication system, the apparatus comprising:
  means for receiving, by a target base station, a measurement report information from a wireless terminal forwarded to the target base station by a source base station;
  means for processing, by the target base station, the measurement report information;
  means for determining, by the target base station, a handover decision concerning the wireless terminal associated with the measurement report information; and
  means for transmitting a handover command to the wireless terminal via the source base station, by the target base station, wherein the handover command is created by the target base station and forwarded to the wireless terminal by the source base station.

26. The communications apparatus of claim 25, further comprising means for processing supplemental information included in the measurement report information to facilitate executing a handover complete function in the wireless communication system.

27. The communications apparatus of claim 25, wherein the handover command includes additional information to facilitate executing a handover complete function in the wireless communication system.

28. A communications apparatus, comprising:
  means for transmitting measurement report information to a source base station for source base station encapsulation into an inter-node message and forwarding to a target base station; and
  means for receiving a source base station encapsulated handover command forwarded from the source base station, wherein the source base station encapsulated handover command message includes a handover command generated by the target base station, wherein the handover command is created by the target base station and encapsulated with integrity protection information and forwarded to the communications apparatus by the source base station.

29. The communications apparatus of claim 28, further comprising means for processing supplemental information included in the encapsulated handover command to facilitate generating a handover complete indication.

30. The communications apparatus of claim 28, further comprising means for appending additional information to the measurement report information to facilitate generating a handover complete indication.

31. A non-transitory computer-readable medium having computer-executable instructions stored thereon comprising:
  a first instruction set for receiving, by a source node, a handover command message created by a target node for a mobile device;
  a second instruction set for encapsulating, by the source node, the handover command message into a source base station Radio Resource Control message with integrity protection information; and
  a third instruction set for forwarding the encapsulated handover command message, by the source node, to the mobile device.

32. The computer-readable medium of claim 31, further comprising a fourth instruction set for enciphering an encapsulated handover command message based on a pre-existing security relation between the mobile device associated with the handover command message and the source node.

33. The computer-readable medium of claim 31, further comprising a fourth instruction set for appending one or more of the integrity protection information and a Radio Resource Control header.

34. A non-transitory computer-readable medium having computer-executable instructions stored thereon comprising:
  a first instruction set for receiving, by a target base station, a measurement report message forwarded from a mobile device by a source base station;
  a second instruction set for processing, by the target base station, the measurement report message;
  a third instruction set for determining, by the target base station, a handover decision concerning the mobile device associated with the measurement report message; and
  a fourth instruction set for transmitting a handover command to the mobile device via the source base station, by the target base station, wherein the handover command is created by the target base station and forwarded to the mobile device by the source base station.

35. The computer-readable medium of claim 34, further comprising a fifth instruction set for processing supplemental information included in the measurement report message to facilitate generating a handover complete indicator.

36. The computer-readable medium of claim 34, wherein the handover command includes additional information to facilitate generating a handover complete indicator.

37. In a wireless communication system, an apparatus comprising:
  a processor configured to:
    receive, by a source base station, a handover command message created by a target base station for a subscriber unit,
    encapsulate, by the source base station, the handover command message into a source base station Radio Resource Control message with integrity protection information; and a memory coupled to the processor, and
    forward the encapsulated handover command message, by the source base station, to the subscriber unit.

38. The communications system of claim 37, wherein the processor is further configured to encipher an encapsulated handover command message utilizing a preexisting security relation between a subscriber unit associated with the handover command message and the source base station.

39. The communications system of claim 37, wherein the processor is further configured to append at least one of the integrity protection information and a Radio Resource Control header.

40. In a wireless communication system, an apparatus comprising:
  a processor configured to:
    receive, by a target node, a measurement report message forwarded from a mobile device by a source node,
    process, by the target node, the measurement report message;
    determine, by the target node, a handover decision concerning the mobile device associated with the measurement report message; and
    transmit a handover command to the mobile device, by the target node, wherein the handover command is created by the target node and forwarded to the mobile device by the source node; and
  a memory coupled to the processor.

41. The communications system of claim 40, wherein the processor is further configured to extract additional information included in the measurement report message to facilitate generating a handover complete indication.

42. The communications system of claim 40, wherein the handover command includes supplemental information to facilitate generating a handover complete indicator indication.

43. In a wireless communication system, an apparatus comprising:
a processor configured to:
transmit a measurement report message to a source base station for source base station encapsulation into an inter-node message and forwarding to a target base station; and
receive a source base station encapsulated handover command message forwarded from the source base station, wherein the source node encapsulated handover command message includes a handover command generated by the target node, wherein the handover command is created by the target base station and encapsulated with integrity protection information and forwarded to the apparatus by the source base station; and
a memory coupled to the processor.

44. The communications system of claim 43, wherein the processor is further configured to process supplemental information included in the encapsulated handover command message to facilitate generating a handover complete indicator in the wireless communication system.

45. The communications system of claim 43, wherein the processor is further configured to append additional information to the measurement report message to facilitate generating a handover complete indicator in the wireless communication system.

* * * * *